United States Patent [19]

Matsuda

[11] Patent Number: 4,970,649
[45] Date of Patent: Nov. 13, 1990

[54] ANTI-SKID BRAKE CONTROL SYSTEM WITH PROJECTED VEHICLE SPEED DERIVATION WITH VARIABLE GRADIENT DEPENDING UPON VEHICULAR BRAKING CONDITION

[75] Inventor: Toshiro Matsuda, Kanagawa, Japan

[73] Assignee: Nissan Motor Company, Limited, Yokohama, Japan

[21] Appl. No.: 239,815

[22] Filed: Sep. 2, 1988

[30] Foreign Application Priority Data

Sep. 4, 1987 [JP] Japan ................. 62-220452

[51] Int. Cl.$^5$ .................................. B60T 8/58
[52] U.S. Cl. .................. 364/426.02; 364/565; 303/95; 303/103
[58] Field of Search ............ 364/426.02, 565, 566; 303/95, 97, 103, 105, 109, 110; 180/197

[56] References Cited

U.S. PATENT DOCUMENTS

| | | | |
|---|---|---|---|
| 4,384,330 | 5/1983 | Matsuda et al. | 303/109 |
| 4,430,714 | 2/1984 | Matsuda et al. | 364/426.02 |
| 4,597,052 | 6/1986 | Matsuda | 364/550 |
| 4,656,588 | 4/1987 | Kubo | 364/426.02 |
| 4,660,146 | 4/1987 | Kubo | 364/426.02 |
| 4,663,715 | 5/1987 | Kubo | 364/426.02 |
| 4,663,716 | 5/1987 | Kubo | 364/426.02 |
| 4,665,490 | 5/1987 | Masaki et al. | 303/110 |
| 4,665,491 | 5/1987 | Kubo | 364/565 |
| 4,666,218 | 5/1987 | Masaki et al. | 303/109 |
| 4,669,045 | 5/1987 | Kubo | 364/426.02 |
| 4,669,046 | 5/1987 | Kubo | 364/426.02 |
| 4,674,049 | 6/1987 | Kubo | 364/426.02 |
| 4,674,050 | 6/1987 | Kubo | 364/426.02 |
| 4,675,819 | 6/1987 | Fennel | 364/426.02 |
| 4,679,146 | 7/1987 | Kubo | 364/426.02 |
| 4,680,713 | 7/1987 | Kubo | 364/426.02 |
| 4,680,714 | 7/1987 | Kubo | 364/426.02 |
| 4,682,295 | 7/1987 | Kubo | 364/426.02 |
| 4,704,684 | 11/1987 | Kubo | 364/426.02 |
| 4,718,013 | 1/1988 | Kubo | 364/426.02 |
| 4,787,682 | 11/1988 | Muto | 303/103 |
| 4,818,037 | 4/1989 | McEnnan | 364/426.02 |
| 4,852,951 | 8/1989 | Matsuda | 303/109 |

*Primary Examiner*—Gary Chin
*Attorney, Agent, or Firm*—Foley & Lardner, Schwartz, Jeffery, Schwaab, Mack, Blumenthal & Evans

[57] ABSTRACT

An anti-skid brake control system for an automotive brake system performs anti-skid brake control for maintaining a rotation speed of a vehicular wheel in a optimal relationship with a projected vehicular speed. The projected vehicular speed is derived on the basis of the wheel rotation speed latched at predetermined timing in each skid cycle. Based on the latched wheel rotation speed, gradient value which represents variation rate of the projected vehicular speed, is derived. The gradient value is varied with a correction which is derived on the basis of a preselected correction factor, such as magnitude of braking force exerted on the vehicular wheel.

20 Claims, 9 Drawing Sheets

ANTI-SKID BRAKE CONTROL SYSTEM WITH PROJECTED VEHICLE SPEED DERIVATION WITH VARIABLE GRADIENT DEPENDING UPON VEHICULAR BRAKING CONDITION

BACKGROUND OF THE INVENTION

1. Field of the Invention

The present invention relates generally to an anti-skid brake control system for an automotive vehicle. More specifically, the invention relates to an anti-skid brake control system associated with a vehicular speed data projecting means which exhibits improved projected vehicle speed derivation characteristics, particularly with respect to variations in road friction.

2. Description of the Background Art

It is well known that vehicular braking performance becomes optimum when wheel slippage becomes a certain value, e.g. 10% to 20%. Therefore, as is well known, anti-skid or anti-lock brake control is generally performed for maintaining the wheel slippage within a predetermined optimal range. For this purpose, wheel slippage is monitored for controlling operational modes of a vehicular braking system for increasing braking pressure in an APPLICATION mode, holding braking pressure constant in a HOLD mode and decreasing braking pressure in a RELEASE mode. In the vehicular anti-skid brake control, the APPLICATION mode is selected in a normal operational condition for allowing linear deceleration of the vehicle with increasing braking pressure. Anti-skid control is initiated upon detection of wheel deceleration during braking operation, in a greater magnitude than a preset deceleration threshold to switch operational mode of the brake system from APPLICATION mode to HOLD mode. Therefore, at the initial stage of an anti-skid brake control cycle, the braking pressure is held constant in the HOLD mode at an increased pressure, when the wheel deceleration exceeds the wheel deceleration threshold. Because of the increased pressure in this HOLD mode, wheel speed further decelerates at a greater rate than deceleration of the vehicle speed. Therefore, wheel slippage which represents a ratio of difference of the vehicle speed and the wheel speed versus the vehicle speed, becomes greater than a target speed which represents the optimal wheel speed for obtaining optimum vehicular braking characteristics. When the wheel slippage becomes greater than a wheel slippage threshold and thus the wheel speed decreases across the target speed, operational mode of the brake system is again switched into the RELEASE mode for decreasing the braking pressure for resuming the wheel speed toward the target speed. Hence, the wheel speed passes the target speed, and wheel acceleration increases across a preset acceleration threshold. Then, the mode is again switched into the HOLD mode. Because of decreased braking pressure, the wheel speed overshoots the vehicle speed and then decelerates to the vehicle speed. Accordingly, the wheel acceleration again decreases across the acceleration threshold, and the mode is switched to APPLICATION mode again.

In the anti-skid control set forth above, it becomes necessary to monitor the vehicle speed for deriving the wheel slippage. It is possible to directly measure the vehicle speed by means of an appropriate sensor, such as a doppler sensor. However, such a sensor is unacceptably expensive and therefore is not practical for use in the anti-skid control system in view of the cost. Therefore, a usual method for monitoring the vehicle speed in anti-skid control involves latching a wheel speed upon initiation of anti-skid control as a vehicle speed representative datum, because upon initiation of the anti-skid control the point where the wheel deceleration exceeds the wheel deceleration threshold, is approximately coincident with the vehicle speed. This vehicle speed representative datum will be hereafter referred to as "projected speed". Based on the latched value, a vehicle speed represented datum is projected utilizing a given gradient of vehicular speed which can be derived in various ways.

For example, Japanese Patent First (unexamined) Publication (Tokkai) Showa No. 60-261767 discloses one approach for deriving the gradient of vehicular speed. In the disclosed system, the gradient of vehicular speed is determined on the basis of a difference of the latched wheel speeds latched in the current and immediately preceding anti-skid brake control cycles. Such a system is generally effective in projecting the projected speed at acceptable precision level. However, a difficulty is encountered when road friction varies during the skid cycle. Namely, when the road friction changes from low friction to high friction, wheel acceleration and deceleration gradients becomes greater. In such case, since the gradient can not be adjusted during the anti-skid brake control cycle, the gradient derived with respect to low friction road continues to be used. As a result, projected speed becomes far higher than the actual speed. Therefore, anti-skid control becomes unacceptably inaccurate.

SUMMARY OF THE INVENTION

Therefore, it is an object of the present invention to provide an anti-skid brake control system which can derive a projected speed by maintaining an acceptable precision level even when friction varies.

In order to accomplish the aforementioned and other objects, an anti-skid brake control system for an automotive brake system performs anti-skid brake control for maintaining a rotation speed of a vehicular wheel in an optimal relationship with a projected vehicular speed. The projected vehicular speed is derived on the basis of the wheel rotation speed latched at predetermined timing in each skid cycle. Based on the latched wheel rotation speed, gradient value which represents rate of variation the projected vehicular speed, is derived. The gradient value is varied with a correction value which is derived on the basis of a preselected correction factor, such as magnitude of braking force exerted on the vehicular wheel.

According to one aspect of the invention, an anti-skid brake control system for an automotive brake system comprises a hydraulic brake circuit having a unit for building up braking fluid pressure according to operational magnitude of a manually operable braking member, and a unit, associated with a vehicular wheel, for generating a braking force to decelerate the vehicular wheel, a pressure adjusting unit, disposed within the hydraulic circuit, for adjusting pressure of a working fluid to be delivered to the braking force generating unit, the pressure adjusting unit being operable at least in a first mode for increasing braking pressure in the braking force generating unit and in a second mode for decreasing the braking pressure, a sensor means for monitoring rotation speed of the vehicular wheel to produce a sensor signal representative of the rotation speed of the vehicular wheel, a first unit for detecting a predetermined vehicular braking condition satisfying a predetermined anti-skid brake control condition for initiating anti-skid control operation, a second unit for latching a first wheel speed indicative value corresponding to instantaneous wheel speed indicative sensor signal values at a predetermined timing in each skid cycle and periodically latching a second wheel speed indicative value corresponding to instantaneous wheel speed indicative value, for deriving a gradient variation of vehicular speed variation on the basis of the latched first and second wheel speed indicative values and the interval of occurrences of latching of the wheel speed indicative values, third unit for monitoring a preselected gradient correction factor for deriving a correction value based thereon, for modifying the gradient of vehicular speed with the correction value, fourth unit for deriving a projected vehicular speed representative datum in a second skid cycle immediately following the first skid cycle utilizing the modified gradient, and fifth unit for controlling the pressure adjusting means between the first and second modes for maintaining the rotation speed of the vehicular wheel in a predetermined optimal relationship with the projected vehicular speed representative datum.

Preferably, the fourth unit monitors braking pressure in the braking force generating means for deriving the correction value based thereon. In addition, the pressure adjusting means is further operable in a third mode for holding the braking pressure in the braking force generating unit constant, the fifth unit performs anti-skid brake control in each skid cycle according to a predetermined schedule, in which the pressure adjusting unit is operated alternatively and periodically to the first mode and the third mode for increasing braking pressure in the braking force generating unit in stepwise fashion, and the fourth unit counting occurrence of the first mode for detecting magnitude of increase in the braking pressure.

In the preferred construction, the anti-skid brake control system further comprises sixth unit associated with the fourth unit for receiving the counted value of occurrences of the first mode and comparing the counted value with a given criterion representative of a predetermined road friction criterion, the sixth unit being responsive to an increase in the counted value across the given criterion for operating the second unit for updating the latched first wheel speed indicative value with the latched second wheel speed indicative value. The sixth unit is active when the absolute value of the gradient is smaller than a preset value, to operate the second means for updating the latched first wheel speed indicative value with the second wheel speed indicative value in response to the counted value increasing across the road friction criterion.

According to another aspect of the invention, an anti-skid brake control system for an automotive brake system comprises a hydraulic brake circuit having unit for building up braking fluid pressure according to operational magnitude of a manually operable braking member, a unit, associated with a vehicular wheel, for generating braking force to decelerate the vehicular wheel, a pressure adjusting unit, disposed within the hydraulic circuit, for adjusting pressure of a working fluid to be delivered to the braking force generating unit, the pressure adjusting unit being operable at least in a first mode for increasing braking pressure in the braking force generating unit and in a second mode for decreasing the braking pressure, a sensor unit for monitoring rotation speed of the vehicular wheel to produce a sensor signal representative of the rotation speed of the vehicular wheel, a first unit for detecting a predetermined vehicular braking condition satisfying a predetermined anti-skid brake control condition for initiating anti-skid control operation, a second unit for latching a first wheel speed indicative value corresponding to instantaneous wheel speed indicative sensor signal values at predetermined timings in each skid cycle and periodically latching a second wheel speed indicative value corresponding to instantaneous wheel speed indicative value, for deriving a gradient of vehicular speed on the basis of the latched first and second wheel speed indicative values and the interval of occurrences of latching of the wheel speed indicative values, third unit for monitoring preselected gradient correction factor for deriving a correction value based thereon and for modifying the gradient of vehicular speed with the correction value, sixth unit for monitoring road friction varying across a predetermined road friction criterion to operate the second unit for updating the latched first wheel speed indicative value with the latched second wheel speed indicative value, fifth unit for controlling the pressure adjusting means between the first and second modes for maintaining the rotation speed of the vehicular wheel in a predetermined optimal relationship with the projected vehicular speed representative datum.

According to a further aspect of the invention, an anti-skid brake control system for an automotive brake system comprises a hydraulic brake circuit having a unit means for building up braking fluid pressure according to operational magnitude of a manually operable braking member, first braking force generating unit, associated with a first vehicular wheel, for generating a braking force to decelerate the first vehicular wheel, and second braking force generating unit, associated with a second vehicular wheel, for generating braking force to decelerate the second vehicular wheel, a first pressure adjusting unit, disposed within the hydraulic circuit, for adjusting pressure of a working fluid to be delivered to the first braking force generating unit, the pressure adjusting unit being operable at least in a first mode for increasing braking pressure in the first braking force generating unit and in a second mode for decreasing the braking pressure, a second pressure adjusting unit, disposed within the hydraulic circuit, for adjusting pressure of a working fluid to be delivered to the second braking force generating unit, the pressure adjusting unit being operable at least in a first mode for increasing braking pressure in the braking force generating unit and in a second mode for decreasing the second braking pressure, a first sensor unit for monitoring rotation speed of the first vehicular wheel to produce a first sensor signal representative of the rotation speed of the vehicular wheel, a second sensor unit for monitoring rotation speed of the second vehicular wheel to produce a second sensor signal representative of the rotation speed of the vehicular wheel, a unit for comparing the first and second sensor signal values for selecting one having greater value as a common wheel speed indicative datum, a first unit for detecting a predetermined vehicular braking condition satisfying a predetermined anti-skid brake control condition for initiating anti-skid control operation, a second unit for latching a first wheel speed indicative value corresponding to instantaneous value of the common wheel speed indicative datum at a predetermined timing in each skid cycle and periodically latching a second wheel speed indicative value corresponding to instantaneous value of the common wheel speed indicative datum, and for deriving a gradient variation of vehicular speed variation on the basis of the latched first and second wheel speed indicative values and the interval of occurrences of latching of the wheel speed indicative values, a third unit for monitoring preselected gradient correction factor for deriving correction value based thereon for modifying the gradient of vehicular speed with the correction value, a fourth unit for deriving a projected vehicular speed representative datum in a second skid cycle immediately following the first skid cycle utilizing the modified gradient, and a fifth means for controlling the pressure adjusting unit between the first and second modes for maintaining the rotation speed of the vehicular wheel in a predetermined optimal relationship with the projected vehicular speed representative datum.

A further system for deriving a projected vehicle speed representative datum on the basis of a rotation speed of a vehicular wheel, for use in a vehicular slip control, comprises a sensor means for monitoring rotation speed of the vehicular wheel to produce a sensor signal representative of the rotation speed of the vehicular wheel, a first unit for detecting a predetermined vehicular braking condition satisfying a predetermined anti-skid brake control condition for initiating anti-skid control operation, second unit for latching a first wheel speed indicative value corresponding to instantaneous wheel speed indicative sensor signal values at predetermined timings in each skid cycle and periodically latching a second wheel speed indicative value corresponding to instantaneous wheel speed indicative value, for deriving a gradient of vehicular speed on the basis of the latched first and second wheel speed indicative values and the interval of occurrences of latching of the wheel speed indicative values, a third unit for monitoring a preselected gradient correction factor for deriving correction value based thereon for modifying the gradient of vehicular speed with the correction value, and fourth means for deriving a projected vehicular speed representative datum in a second skid cycle immediately following the first skid cycle utilizing the modified gradient.

DESCRIPTION OF THE PREFERRED EMBODIMENT

Figure 1A:
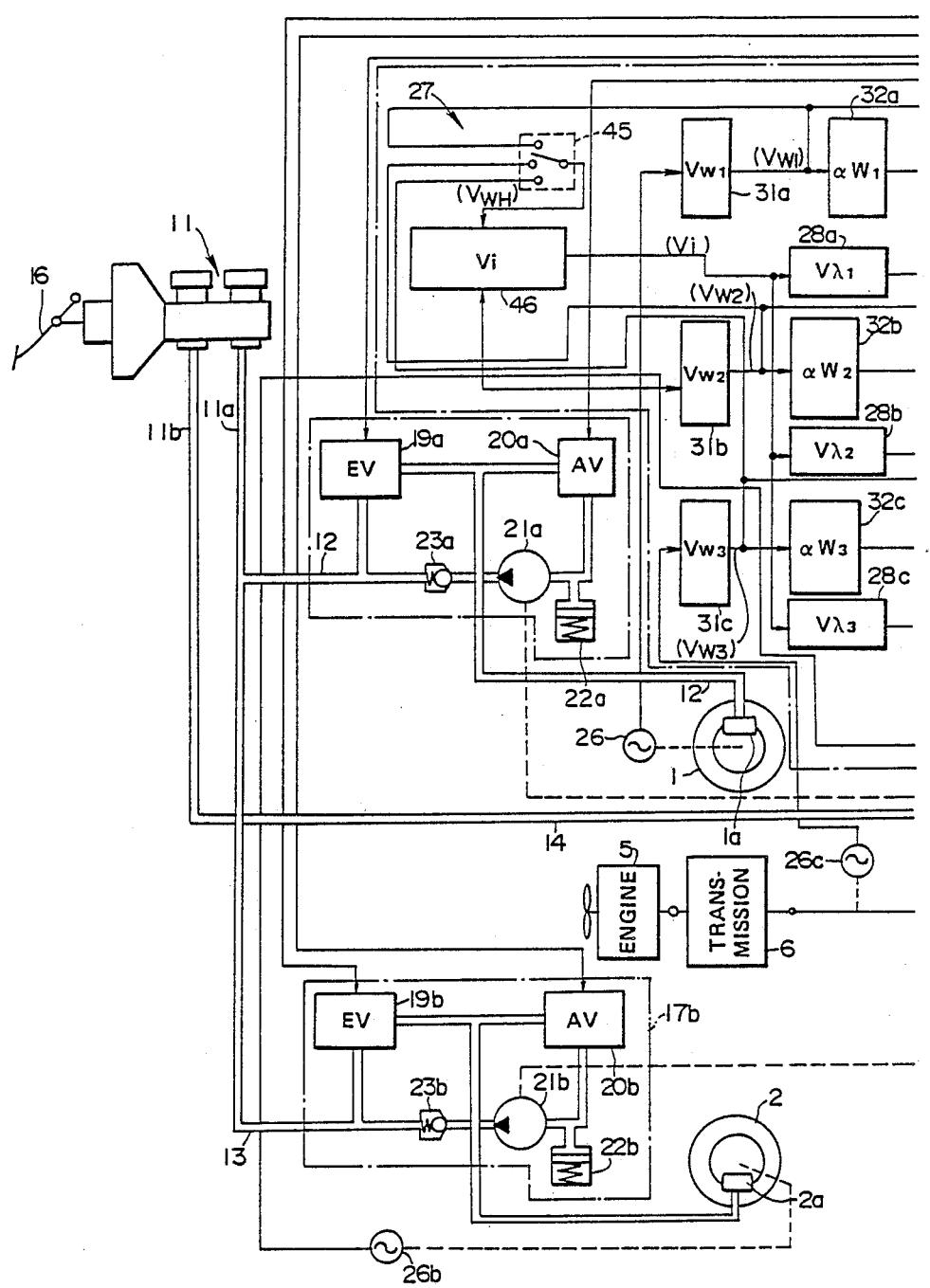
FIGS. 1(A) and 1(B) show an overall circuit diagram of the preferred embodiment of an anti-skid brake control system implementing the present invention.
Figure 1B:
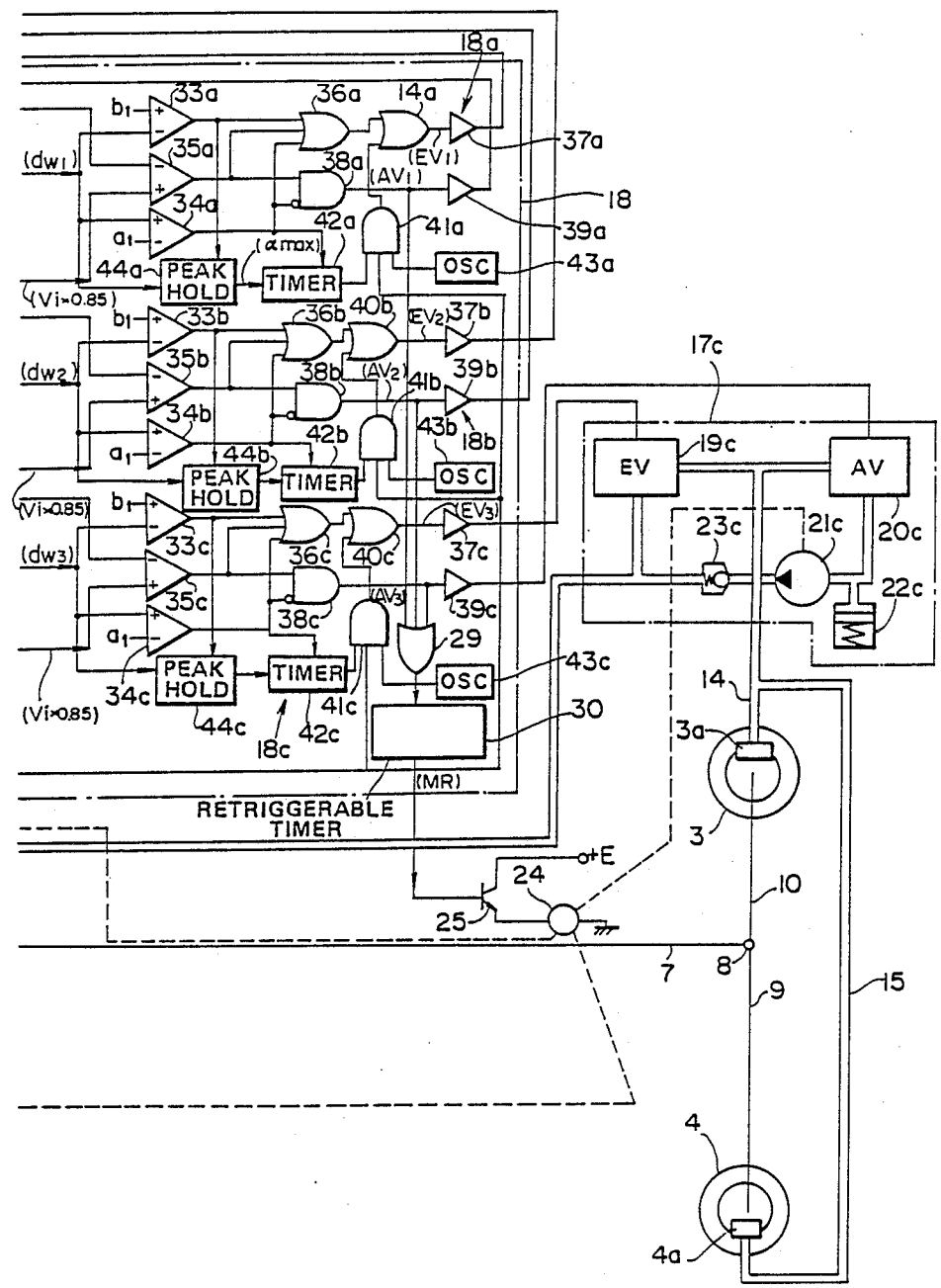

Referring now to the drawings, particularly to FIG. 1, the preferred embodiment of an anti-skid brake control system, according to the present invention, is designed for controlling braking pressure to be exerted on respective front and rear vehicular wheels 1, 2, 3 and 4. Each of the front and rear wheels 1, 2, 3 and 4 are co-operated with wheel cylinders 1a, 2a, 3a and 4a so that the latter may apply braking pressure to respectively associated front and rear wheels. On the other hand, the rear wheels 3 and 4 are connected to an automotive engine 5 through a power train constituted by a transmission 6, a propeller shaft 7, a differential gear unit 8 and drive shafts 9 and 10.

In the shown embodiment, the anti-skid brake control system controls braking force exerted to each wheel cylinder for performing anti-skid brake control and whereby preventing the wheels from skidding. Though it is neglected from the discussion given herebelow, the shown embodiment of the control system may also operate to control engine output torque or driving torque distribution to the driven rear wheels 3 and 4 so as to prevent the wheels from causing wheel-spin and to provide better tire/road traction. The engine output torque control or power distribution control may be performed by adjusting throttle valve angular position by means of a throttle valve servo system, such as that disclosed in British Patent First Publications Nos. 2,154,763 and 2,154,765. The disclosure of the above-identified British Patent First Publications are herein incorporated by reference for the sake of disclosure. Furthermore, traction control systems for adjusting driving torque to be exerted on the driven wheels of the vehicle have been disclosed in the co-pending U.S. patent application Ser. No. 903,474 filed on Sept. 4, 1986, assigned to the common assignee of the present invention. The disclosure of the above-identified co-pending U.S. Patent Application is also herein incorporated by reference for the sake of disclosure.

In the shown embodiment, a hydraulic brake system for applying braking fluid pressure to respective wheel cylinders 1a, 2a, 3a and 4a includes separated hydraulic circuits 12, 13 and 14 which are, in turn, connected to a master cylinder 11 via pressure lines 11a and 11b. One of the hydraulic circuits 12 which is connected to the pressure line 11a, connects one of outlet ports of a master cylinder 11 to front-right wheel cylinder 1a which is associated with the front-right wheel 1. Similarly, the hydraulic circuit 12 which is also connected to the pressure line 11a, is connected to the front-left wheel cylinder 2a of the front-left wheel 2. The other outlet port of the master cylinder 11 is connected to the rear-right wheel cylinder 3a, and through a branch circuit 15, to the rear-left wheel cylinder 4a. As is well known, the master cylinder 11 is mechanically coupled with a brake pedal 16 for building-up braking fluid pressure depending upon magnitude of depression of the brake pedal. The braking fluid pressure built up in the master cylinder 11 is distributed to respective wheel cylinders 1a, 2a, 3a and 4a via the circuits 12, 13, 14 and 15 for exerting braking force to respectively associated wheels 1, 2, 3 and 4.

Anti-skid brake control valves assemblies 17a, 17b and 17c are disposed in the circuits 12, 13 and 14. As will be seen from FIGS. 1(A), 1(B) and 1(C), the anti-skid brake control valve assembly 17c is positioned upstream of the junction between the circuits 14 and 15. Therefore, braking fluid pressure to be exerted to the rear wheel cylinders 3a and 4a is commonly controlled by means of the anti-skid brake control valve assembly 17c. On the other hand, the anti-skid brake control valves 17a and 17b are respectively disposed in the circuits 12 and 13 at the positions downstream of the junction of the circuits 12 and 13 and the pressure line 11a. Therefore, the valves 17a and 17b controls braking fluid pressures at associated one of the wheel cylinders 1a and 2a, independently of each other.

The anti-skid brake control valve assemblies 17a, 17b and 17c have mutually identical constructions to each other. Therefore, it would not be necessary to give a detailed description of the constructions for the valve assemblies 17a, 17b and 17c, respectively. In order to avoid redundant recitation and avoiding confusion in understanding the invention, the construction of the anti-skid brake control valve assembly 17a will only be described herebelow. The constructions of the valve assemblies 17b and 17c should be understood as identical to that of the valve assembly 17a set out below.

The anti-skid brake control valve assembly 17a includes an inlet (EV) valve 19a, outlet (AV) valve 20a, a fluid pump 21a, accumulator 22a and one-way check valve 23a. The EV valve 19a has an inlet port connected to the associated outlet port of the master cylinder 11 via the hydraulic circuit 12 and an outlet port connected to the front-right wheel cylinder 1a. On the other hand, the AV valve 20a has an inlet port connected to the wheel cylinder 1a and an outlet port connected to the accumulator 22a. The accumulator 22a is further connected to the hydraulic circuit 12 via the fluid pump 21a and the one-way check valve 23a for feeding back excessive fluid pressure therethrough. The fluid pump 23a is designed to draw the pressurized fluid in the associated wheel cylinder 1a to quickly reduce the braking pressure in the wheel cylinder while the anti-skid brake control is performed.

The valve position of the EV valve 19a is controlled by an inlet control signal $EV_1$ from a control unit 18 between closed position and open position. Similarly, the valve position of the AV valve 20a is controlled by an outlet control signal $AV_1$ from the control unit 18 between closed position and open position. Furthermore, the fluid pump 21a is connected to the control unit 18 to receive a pump drive signal MR to control its operation between driving condition and resting condition.

In the preferred embodiment, the EV valve 19a is in the open position while the inlet control signal $EV_1$ is at a LOW level. On the other hand, the AV valve 20a is in the closed position while the outlet control signal $AV_1$ is at a LOW level. The anti-skid brake control valve assembly 17a is operable in APPLICATION mode, RELEASE mode and HOLD mode. In the APPLICATION mode, the inlet control signal $EV_1$ is held LOW to maintain the EV valve 19a in open position. At the same time, the outlet control valve $AV_1$ is also held LOW to maintain the AV valve 20a in the closed position. Therefore, the outlet port of the master cylinder 11 is connected to the wheel cylinder 1a through the hydraulic circuit 12 and the EV valve 19a. Therefore, the braking fluid pressure in the wheel cylinder 1a is increased proportionally to that built-up in the master cylinder. On the other hand, in the RELEASE mode, the inlet control signal $EV_1$ is switched into a HIGH level to operate the EV valve 19a at the closed position. This shuts off the fluid communication between the outlet port of the master cylinder 11 and the wheel cylinder 1a therethrough. On the other hand, at this time, the outlet control signal $AV_1$ also becomes HIGH level to open the AV valve 20a. As a result, fluid communication between the wheel cylinder 1a and the accumulator 22a is established. At the same time, the pump drive signal MR turns into HIGH to drive the fluid pump 21a. Therefore, the fluid pressure in the accumulator 22a becomes lower than that in the wheel cylinder 1a. Therefore, the braking fluid in the wheel cylinder 1a is drawn into the pressure accumulator.

On the other hand, in the HOLD mode, the inlet control signal $EV_1$ is set HIGH level to close the EV valve 19a and the outlet control signal $AV_1$ is set LOW level to maintain the AV valve 20a at closed position. Therefore, the wheel cylinder 1a has a blocked fluid communication with the master cylinder 11 and the accumulator 22a. Therefore, the fluid pressure in the wheel cylinder 1a is held constant. The relationship of the inlet and outlet control signals $EV_1$ and $AV_1$ and the pump drive signal MR will be clearly seen from the following table:

TABLE

|  | APPLICATION | RELEASE | HOLD |
|---|---|---|---|
| $EV_1$ | LOW | HIGH | HIGH |
| $AV_1$ | LOW | LOW | HIGH |
| MR | — | — | HIGH |

As set forth the pressure control valve assemblies 17b and 17c are of identical constructions and operations as that set forth above with respect to the pressure control valve assembly 17a. For the sake of illustration, each components in the pressure control valve assemblies 17b and 17c are identified by the same reference numerals with corresponding suffixes (b, c).

The control unit 18 is connected to wheel speed sensors 26a, 26b and 26c for receiving pulse signal having frequency proportional to the rotation speed of the associated wheels 1, 2, 3 and 4. In practice, each of the wheel speed sensors 26a and 26b comprises a sensor rotor adapted to rotate with the vehicle wheel and a sensor assembly fixedly secured to the shim portion of the knucle spindle. The sensor rotor is fixedly secured to a wheel hub for rotation with the vehicle wheel. The sensor rotor may be formed with a plurality of sensor teeth at regular angular intervals. The width of the teeth and the grooves therebetween are preferably equal to each other and define a unit angle of wheel rotation. The sensor assembly comprises a magnetic core aligned with the north pole head at the sensor rotor and the south pole head distal from the sensor rotor. A metal element with a smaller diameter section is attached to the end of the magnetic core near the sensor rotor. The free end of the metal element faces the sensor teeth. An electromagnetic coil encircles the smaller diameter section of the metal element. The electromagnetic coil is adapted to detect variation in the magnetic field generated by the magnetic core to produce an alternating-current sensor signal. Namely, the metal element and the magnetic core form a kind of proximity switch which adjusts the magnitude of the magnetic field depending upon the distance between the free end of the metal element and the sensor rotor surface. Thus, the intensity of the magnetic field fluctuates in relation to the passage of the sensor teeth and accordingly in relation to the angular velocity of the wheel.

Such a wheel speed sensor has been disclosed in U.S. Pat. No. 4,597,052, issued on Jun. 24, 1986, for example. The disclosure of the U.S. Pat. No. 4,597,052 is herein incorporated by reference for the sake of disclosure.

On the other hand, the wheel speed sensor 26c is associated with the propeller shaft 7 for producing a frequency signal having a frequency proportional to the rotation speed of the propeller shaft. The practical construction of the propeller shaft associated wheel speed sensor 26c is similar to that of the wheel speed sensors 26a and 26b. Therefore, detailed discussion about the construction of the wheel speed sensor 26c will not be given in view of simplification of the disclosure.

The control unit 18 has controller circuit sections 18a, 18b and 18c for outputting inlet and outlet control signals. The controller circuit section 18a is designed to produce the inlet and outlet control signals $EV_1$ and $AV_1$ for the pressure control valve assembly 17a on the basis of the wheel speed indicative pulse signal from the wheel speed sensor 26a and representative of the rotation speed of the right-front wheel 1. Similarly, the controller circuit section 18b is designed to produce the inlet and outlet control signals $EV_2$ and $AV_2$ for the pressure control valve assembly 17b on the basis of the wheel speed indicative pulse signal output from the wheel speed sensor 26b and representative of the rotation speed of the left-front wheel 2. The controller circuit section 18c is designed to produce the inlet and outlet control signals $EV_3$ and $AV_3$ for the pressure control valve assembly 17c on the basis of the pulse signal from the wheel speed sensor 26c and representative of the rotation speed of the propeller shaft 7 which is, in other words, representative of an average rotation speed of the right-rear and left-rear wheels 3 and 4.

As with the anti-skid brake control valves 17a, 17b and 17c, the controller circuit sections 18a, 18b and 18c are essentially the identical circuit constructions to each other. Therefore, the following discussion will be given only for the controller circuit section 18a. The corresponding circuit elements in the controller circuit sections 18b and 18c are represented by the same reference numerals with different suffixes which identify the section to include the circuit elements.

As will be seen from FIG. 1, the controller circuit section 18a includes a wheel speed derivation circuit 31a and a wheel acceleration derivation circuit 32a. The wheel speed derivation circuit 31a receives the wheel speed indicative pulse signal from the wheel speed sensor 26a. Based on the frequency or pulse period of the wheel speed indicative pulse signal of the wheel speed sensor 26a and rotation radius of the right-front wheel, the wheel speed derivation circuit 31a derives an angular velocity of the right-front wheel and whereby derives an instantaneous wheel speed $Vw_1$ of the right-front wheel 1. The wheel speed derivation circuit 31a produces a wheel speed signal indicative of the derived wheel speed $Vw_1$. The wheel acceleration derivation circuit 32a receives the wheel speed signal from the wheel speed derivation circuit 31a. The wheel acceleration derivation circuit 32a derives wheel acceleration $\alpha w_1$ and produces a wheel acceleration indicative signal. Derivation of the wheel acceleration $\alpha w_1$ based on the variation of wheel speed $Vw_1$ indicated in the wheel speed signal, can be performed by differentiating the differences of the wheel speeds input at different and consecutive timings. Otherwise, the wheel acceleration may be derived directly from the wheel speed indicative pulse signal from the wheel speed sensor 26a in a manner disclosed in the aforementioned U.S. Pat. No. 4,597,052. Manners of derivation of the wheel speed $Vw_1$ and wheel acceleration $\alpha w_1$ have also been disclosed in:

U.S. Pat. No. 4,674,049, issued on Jun. 16, 1987
U.S. Pat. No. 4,704,684, issued on Nov. 3, 1987
U.S. Pat. No. 4,663,715, issued on May 5, 1987
U.S. Pat. No. 4,663,716, issued on May 5, 1987
U.S. Pat. No. 4,660,146, issued on Apr. 21, 1987
U.S. Pat. No. 4,665,491, issued on May 12, 1987
U.S. Pat. No. 4,674,050, issued on Jun. 16, 1987
U.S. Pat. No. 4,680,714, issued on Jul. 12, 1987
U.S. Pat. No. 4,682,295, issued on Jul. 21, 1887
U.S. Pat. No. 4,680,713, issued on Jul. 14, 1987
U.S. Pat. No. 4,669,046, issued on May 26, 1987
U.S. Pat. No. 4,669,045, issued on May 26, 1987
U.S. Pat. No. 4,679,146, issued on Jul. 7, 1987
U.S. Pat. No. 4,656,588, issued on Apr. 7, 1987
U.S. Pat. No. 4,718,013, issued on Jan. 5, 1988
U.S. Pat. No. 4,569,560, issued on Feb. 11, 1986

All sixteen prior published U.S. Patents are issued to common applicant, i.e. Jun KUBO and commonly assigned to the common assignee to the present invention. The disclosures of the above-listed U.S. Patents are herein incorporated by reference for the sake of disclosure.

The wheel acceleration indicative signal of the wheel acceleration derivation circuit 32a is transmitted to a comparators 33a and 34a. In order to receive the wheel acceleration indicative signal, the comparator 33a is connected to the wheel acceleration derivation circuit 32a at an inverting input terminal. On the other hand, the comparator 34a is connected to the wheel acceleration derivation circuit 32a at a non-inverting input terminal thereof for receiving the wheel acceleration indicative signal therethrough. The wheel acceleration derivation circuit 32a is further connected to a peak detector circuit 44a which is designed for detecting a peak value of the wheel acceleration $\alpha w_1$ and holds the peak value.

The non-inverting input terminal of the comparator 33a is connected to a reference signal generator (not shown) for receiving therefrom a deceleration threshold indicative reference signal $-b$. The deceleration threshold indicative reference signal has a value representative of a predetermined deceleration threshold to be compared with the wheel acceleration value $\alpha w_1$. The comparator 33a normally outputs a LOW level comparator signal as long as the wheel acceleration $\alpha w_1$ is maintained higher than the deceleration threshold $-b$. The comparator 33a is responsive to the wheel acceleration $\alpha w_1$ dropping across the deceleration threshold $-b$ to output a HIGH level comparator signal.

The inverting input terminal of the comparator 34a is connected to a reference signal generator (not shown) which generates an acceleration threshold indicative reference signal having a value indicative of a predetermined wheel acceleration threshold $+a$. The comparator 34a thus compares the wheel acceleration $\alpha w_1$ as indicated in the wheel acceleration indicative signal of the wheel acceleration derivation circuit 32a with the wheel acceleration threshold $+a$. The comparator 34a generally outputs a LOW level comparator signal while the wheel acceleration $\alpha w_1$ is held lower than the wheel acceleration threshold $+a$. The comparator 34a produces a HIGH level comparator signal when the wheel acceleration $\alpha w_1$ rises across the wheel acceleration threshold.

Another comparator 35a is provided in the controller circuit section 18a. The comparator 35a has an inverting input terminal connected the wheel speed derivation circuit 31a for receiving therefrom the wheel speed signal. The comparator 35a also has a non-inverting input terminal connected to a target wheel speed derivation circuit 28a. The target wheel speed derivation circuit 28a generally derives a target wheel speed $V\lambda$ on the basis of a vehicle speed representing value Vi which is derived by a projected vehicle speed representing data derivation circuit 46 and a desired optimum wheel slippage for optimizing vehicular braking efficiency. As is well known, the vehicular braking efficiency becomes maximum in a wheel slippage range of 10% to 20%. In the practical embodiment, the target wheel slippage $\lambda$ is set at 15%. On the other hand, the vehicle speed representing value Vi is derived on the basis of an instantaneous wheel speed Vw at the beginning of each cycle of anti-skid brake control. The procedure of derivation of the vehicular speed representing value Vi is discussed later. The target wheel speed $V\lambda$ is derived at a value of 85% of the vehicle speed representing value Vi to indicate 15% of wheel slippage. The comparator 35a maintains a LOW level comparator signal while the wheel speed Vw is maintained higher than the target wheel speed $V\lambda$. On the other hand, the comparator signal level of the comparator 35a turns HIGH when the wheel speed Vw drops across the target wheel speed $V\lambda$.

The comparator signals of the comparators 33a and 34a and 35a are fed to input terminals of an OR gate 36a. The comparator 34a and 35a are also connected to an AND gate 38a to feed the comparator signals. The AND gate 38a has an inverting input terminal connected to the comparator 35a to receive therefrom the comparator signal. The comparator 35a is further connected to a variable timer circuit 42a which will be described later.

The output terminal of the OR gate 36a is connected to one input terminal of an OR gate 40a. The other input terminal of the OR gate 40a is connected to an AND gate 41a. The AND gate 41a has one input terminal connected to the variable timer 42a. Another input terminal of the AND gate 41a is connected to an oscillator 43a which is designed to a given constant frequency of pulse signal. The other input terminal of the AND gate 41a is connected to a retriggerable timer circuit 30 which is designed for producing a pump drive signal MR for driving the fluid pump 21a, 21b and 21c by applying the pump drive signal MR to pump drive motor 24 through a switching transistor 25.

The OR gate 36a and the AND gate 41a are connected to an OR gate 40a which serves to output the inlet control signal $EV_1$. The output terminal of the OR gate 40a is connected to the EV valve 19a of the anti-skid control valve assembly 17a via an amplifier 37a. On the other hand, the AND gate 38a serves to output the outlet control signal $AV_1$ to feed the outlet control signal to the AV valve 20a of the anti-skid control valve assembly 17a, via an amplifier 39a.

The projected vehicle speed representing data derivation circuit 46 is connected to the wheel speed derivation circuit 31a to receive therefrom the wheel signal from time-to-time. The projected vehicle speed representing data derivation circuit 46 is also connected to the retriggerable timer circuit 30. The projected vehicle speed representing data derivation circuit 46 is designed to latch an instantaneous wheel speed Vw as an initial vehicle speed representing value $Vi_1$ in response to the leading edge of a HIGH level timer signal serving as the pump drive signal MR. The projected vehicle speed representing value derivation circuit 46 derives the vehicle speed representing value $Vi_1$ on the basis of the initial vehicle speed representing value corresponding to the latched wheel speed value $Vw_1$ as set forth above.

The projected vehicle speed representing data derivation circuit 46 is also connected to a select-HIGH switch 45 having three terminals respectively connected to the wheel speed derivation circuits 31a, 31b and 31c. The select-HIGH switch 45 selects the greatest value among three wheel speed representing values $Vw_1$, $Vw_2$ and $Vw_3$ from respective wheel speed derivation circuits 31a, 31b and 31c and outputs the selected value as a common wheel speed representing data Vw. The common wheel speed representing data Vw is transferred to the projected vehicle speed representing data derivation circuit 46. Therefore, the projected vehicle speed representing data derivation circuit 46 derives the projected vehicular speed representing data Vi on the basis of the common wheel speed representing data Vw. The projected vehicular speed representing data Vi is delivered to the target wheel speed derivation circuits 28a, 28b and 28c of respective controller circuit sections 18a, 18b and 18c.

Figure 2A:
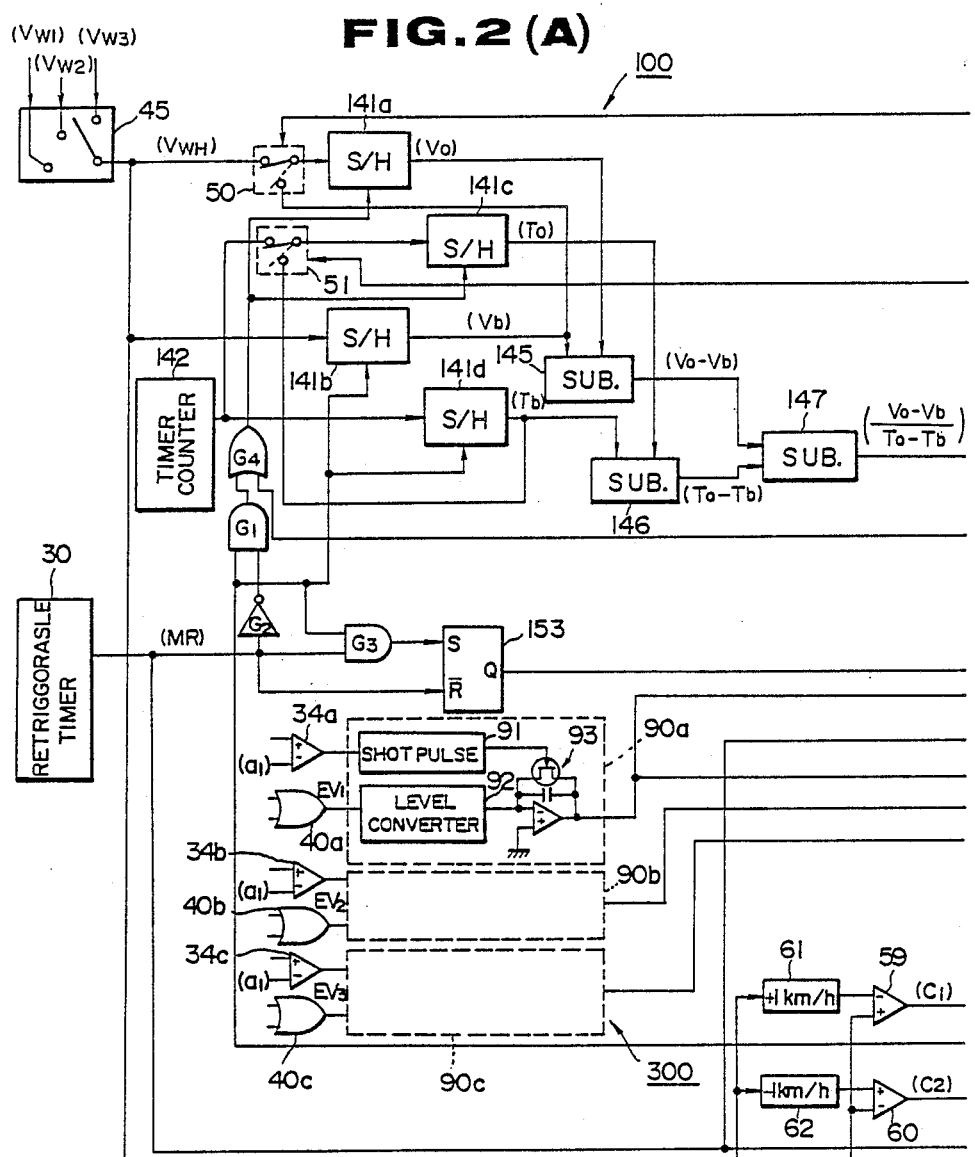
FIGS. 2(A) and 2(B) show a block diagram showing detail of a projected vehicular speed representing data (Vi) derivation circuit in the preferred embodiment of the anti-skid brake control system of FIGS. 1(A) and 1(B)
Figure 2B:
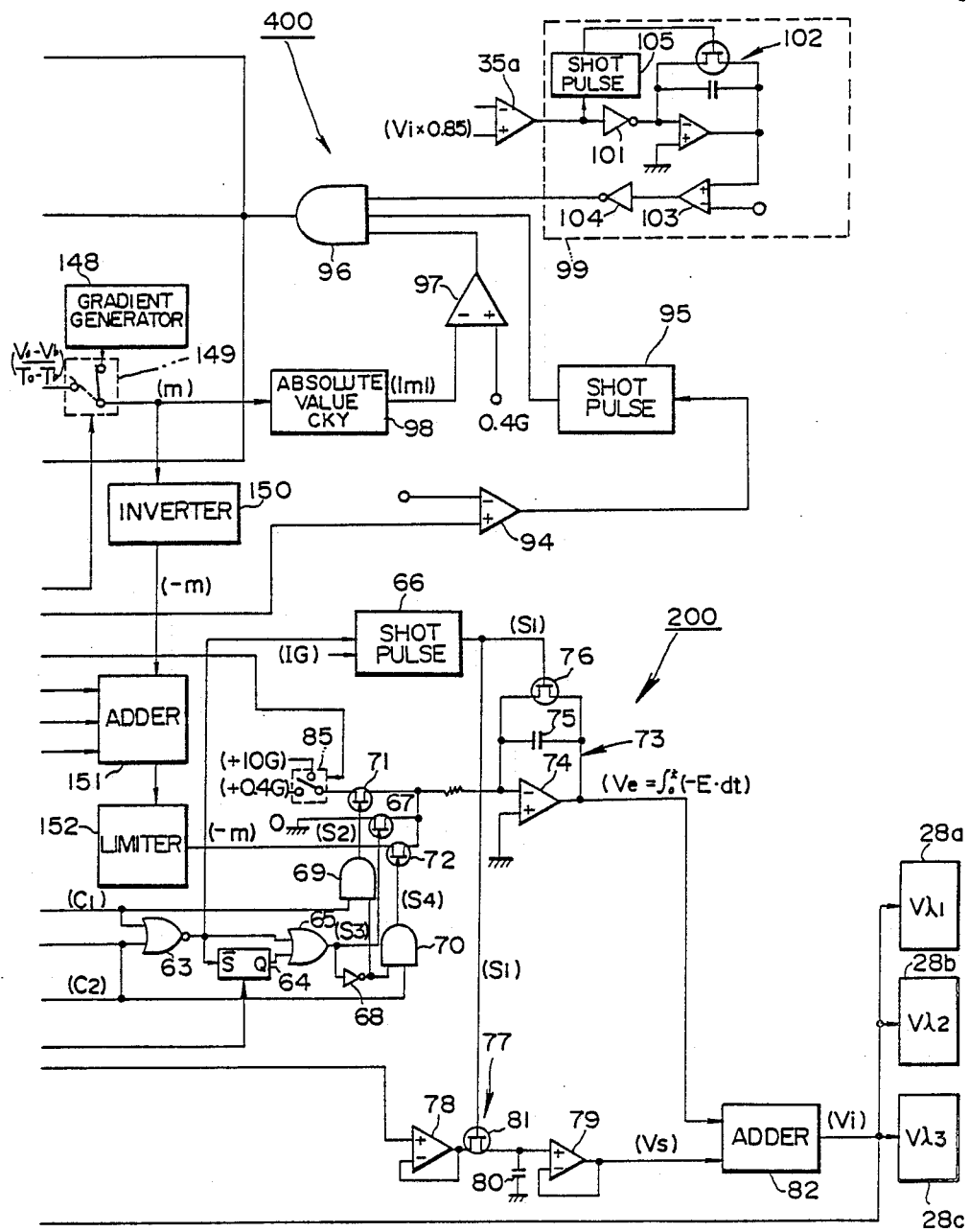

FIG. 2 shows the detailed construction of the projected vehicular speed representing data derivation circuit 46. The projected vehicular speed representing data derivation circuit 46 generally comprises a basic gradient derivation stage 100, a projected vehicular speed representing data derivation stage 200, a re-application detecting stage 300 and a basic gradient correcting stage 400.

The basic gradient derivation stage 100 includes sample/hold circuits 141a, 141b, 141c and 141d. The sample/hold circuit 141a is connected to the select-HIGH switch 45 via a switch 50. The switch 50 selectively connects the sample/hold circuit 141a to the select-HIGH switch 45 and to a subtractor 145 which will be discussed later. Similarly, the sample/hold circuit 141c is connected to the select-HIGH switch 45 via a switch 51. The switch 51 selectively connects the sample/hold circuit 141c to the timer counter 142 and to a subtractor 146 which will be discussed later. On the other hand, the sample/hold circuit 141b is directly connected to the select-HIGH switch 45 to constantly receive the common wheel speed representing data Vw. The sample/hold circuit 141d is connected to a timer counter 142 which is connected to a clock generator (not shown) to count up a periodic timing pulse from the clock generator and having a constant frequency, to output a timer signal. The sample/hold circuit 141d samples and holds the timer signal value of the timer counter 142.

The sample/hold circuits 141a and 141c are connected to an OR gate G4 which has one input terminal connected to an AND gate G1 and the other input terminal connected to an AND gate 96 in the basic gradient correcting stage 400 which will be discussed later. One input terminal of the AND gate G1 is connected to a comparator 60, which will be discussed later, in the projected vehicular speed derivation stage 200 in order to receive a C2 signal therefrom. The other input terminal of the AND gate G1 is connected to the retriggerable timer 30 via an inverter G2 in order to receive inverted MR signal. Therefore, the output of the OR gate G4 serves as sample/hold control command for the sample/hold circuits 141a and 141c. On the other hand, the sample/hold circuits 141b and 141d are directly connected to the comparator 60 to receive the C2 signal therefrom as the sample/hold control command.

With the arrangement set forth above, the sample/hold circuit 141a is responsive to the HIGH level output of the OR gate G4 to hold the common wheel speed representing data Vw. On the other hand, the sample/hold circuit 141b operates in synchronism with the C2 signal to hold the common wheel speed representing data Vw. Similarly, the sample/hold circuit 141c is responsive to the HIGH level output of the OR gate G4 to hold the common wheel speed representing data Vw. On the other hand, the sample/hold circuit 141d operates in synchronism with the C2 signal to hold the timer signal value.

The sampled common wheel speed representing data V0 in the sample/hold circuit 141a, which will be hereafter referred to as "V0 data", and the sampled common wheel speed representing data Vb of the sample/hold circuit 141b, which will be hereafter referred to as "Vb data", are fed to the subtractor 145 when the switches 50 and 51 are both switched to connect the sample/hold circuits to the subtractor as controlled by the output of the AND gate 96. On the other hand, the sampled timer value T0 of the sample/hold circuit 141c which timer value will be hereafter referred to as "T0 timer value", and the sampled timer value Tb of the sample/hold circuit 141d which will hereafter be referred to as "Tb timer value", are fed to the subtractor 146.

The subtractor 145 derives a wheel speed difference data $\Delta V(=V0-Vb)$ based on the input V0 data and Vb data. On the other hand, the subtractor 146 derives a time difference data $\Delta T$ $(=T0-Tb)$ on the basis of the input T0 timer value and the Tb timer value. The wheel speed difference data $\Delta V$ of the subtractor 145 and the time difference data $\Delta T$ of the subtractor 146 are fed to a divider 147. The divider 147 divides the wheel speed difference data $\Delta V$ by the time difference data $\Delta T$ to derive a basic gradient value m.

The divider 147 is connected to an absolute value circuit 98 of the basic gradient correction stage 400 and to an inverting circuit 150 via a switching circuit 149. To the switching circuit 149, a gradient signal generator circuit 148 is designed to produce a fixed gradient indicative signal for the first skid cycle. In the preferred embodiment, the gradient signal generator circuit 148 produces the fixed gradient indicative signal representing preset vehicular deceleration magnitude, e.g. 0.4 g. The switching circuit 149 is connected to a flip-flop circuit 153 to receive the output therefrom as a switching command. The flip-flop 153 has a set input terminal connected to an AND gate G3 which has one input terminal connected to the comparator 60 and the other input terminal connected to the retriggerable timer 30. With this arrangement, the flip-flop is set in response to the leading edge of the HIGH level signal of the AND gate G3. The flip-flop 153 also has a reset input terminal connected to the retriggerable timer 30 to be reset in response to the trailing edge of the MR signal. The flip-flop 153 outputs HIGH level output while it is held at set position, and LOW level output while it is held at reset position. Therefore, at the first skid cycle, the switching circuit 149 is maintained in a position illustrated by the solid line in FIG. 2 in order to connect the gradient signal generator circuit 148 to the absolute value circuit 98 and the inverting circuit 150. On the other hand, in the subsequent skid cycles, the switching circuit 149 is switched at the switch position as illustrated by the broken line to connect the divider circuit 147 to the absolute value circuit 98 and the inverting circuit 150.

The inverter circuit 150 performs inversion for the basic gradient indicative signal output through the switching circuit 149 to "−m". The inverted basic gradient indicative signal −m is input to an adder circuit 151 which will be discussed later.

The projected vehicular speed derivation stage 200 includes a comparator 59 which has a non-inverting input terminal connected to the select-HIGH switch 45 to receive therefrom the common wheel speed representing data Vw. The comparator 59 also has an inverting input terminal connected to an upper deadband reference signal generator circuit 61 to receive therefrom an upper deadband reference signal Vi+ which has a value greater than the projected vehicular speed representing data Vi by 1 km/h. The comparator 59 thus outputs HIGH level comparator signal C1 when the common wheel speed representing data Vw is greater than or equal to the upper deadband reference signal value Vi+ and LOW level comparator signal when the common wheel speed representing data is smaller than the upper deadband reference signal value. As set forth, the projected vehicular speed derivation circuit 200 also has the comparator 60 which has an inverting input terminal connected to the select-HIGH switch 45 and a non-inverting input terminal connected to a lower deadband reference signal generator circuit 62. The lower deadband reference signal generator circuit 62 produces a lower deadband reference signal Vi− which represents a value smaller than the projected vehicular speed representing data Vi by 1 km/h. The comparator 60 thus outputs a HIGH level comparator signal C2 when the common wheel speed representing data Vw is smaller than the lower deadband reference signal value Vi− and the LOW level common wheel speed representing data Vw is greater than or equal to the lower deadband reference signal value Vi−. The comparators 59 and 60 are connected to a NOR gate 63. The NOR gate 63 thus outputs a HIGH level gate signal only when both of the inputs from the comparators 59 and 60 are at the LOW level. Namely, when the common wheel speed representing data Vw is held smaller than the upper deadband reference signal value Vi+ and is greater than or equal to the lower deadband reference signal value Vi−, the gate signal of the NOR gate 63 becomes HIGH. The inverting output terminal of the NOR gate 63 is directly connected to one input terminal of an OR gate 65 and connected to the other input terminal of the OR gate 65 via a timer 64. The timer 64 is responsive to a trailing edge of the HIGH level gate signal of the NOR gate 63 outputting a HIGH level signal for a period which is variable depending upon presence and absence of the MR signal of the retriggerable timer 30. In the preferred embodiment, the timer 64 outputs a HIGH level signal for about 0.1 sec., while the MR signal is absent and outputs a HIGH level signal for about 5 sec., while the MR signal present. Therefore, the gate output of the OR gate 65 is maintained at HIGH level for the period while the output of the timer 64 is held at HIGH level, after changing the signal level of the gate signal of the NOR gate 63 from HIGH to LOW level.

Preferably, the timer 64 provides a capability of varying the preset period in which the HIGH level timer signal is generated. For example, the set $T_3$ period of the timer 64 may be shortened while the MR signal of the retriggerable timer 30 is maintained at HIGH level, than that is used while the MR signal is held LOW. This will further improve response to in variation of the vehicular speed representative data.

The OR gate 65 is directly connected to an analog switch 67 and to one input terminal of an AND gate 70 via an inverter 68. The output terminal of the AND gate 70 is connected to an analog switch 72. The other input terminal of the AND gate 70 is connected to the output terminal of the comparator 60. The output of the OR gate 65 is also fed to one input terminal of an AND gate 69 via the inverter 68, the AND gate 69 has an output terminal connected to an analog switch 71. The other input terminal of the AND gate 69 is connected to the output terminal of the comparator 59.

In the practical embodiment, the analog switches 67, 70 and 71 comprise MOS transistor having gate electrodes connected to the OR gate 65; the AND gate 70 and the AND gate 69 respectively. The AND gates 69 and 70 outputs gate signals $S_4$ and $S_2$ for switching the associated analog switches 71 and 72 between ON and OFF. Similarly, the gate signal $S_3$ of the OR gate 65 serves as a switching signal for the analog switch 67. The analog switch 71 as turned ON, connects an acceleration reference generator 85 to the inverting input terminal of an operational amplifier 74 in an integrator circuit 73. The acceleration reference generator 85 includes an internal switch for selectively outputting two mutually different acceleration reference signals. In the shown embodiment, one of the acceleration reference signals is set at a value corresponding to vehicular acceleration of 0.4G and the other acceleration reference signal is set at a value corresponding to vehicular acceleration of 10 G. Theses two acceleration reference signals represent possible maximum vehicular acceleration. The internal switch of the acceleration reference generator 85 is connected to the retriggerable timer 30 so that it selects 0.4G as the acceleration reference signal when the MR signal of the retriggerable timer 30 is held LOW and selects 10 G as the acceleration reference signal when the MR signal is absent. Therefore, when the anti-skid brake control is not active, the acceleration reference signal is set at a value corresponding to the vehicular acceleration of 0.4 G and is set at the value corresponding to the vehicular acceleration 10 G while anti-skid control is active.

On the other hand, the analog switch 67 as turned ON, connects the inverting input terminal of the operational amplifier 74 of the integrator circuit 73 to the ground. Therefore, when the analog switch 67 is held ON, the input level at the inverting input terminal of the operational amplifier 74 becomes zero (0) level. When the analog switch 72 is turned ON, the inverting input terminal of the operational amplifier 74 is connected to a deceleration reference signal generator circuit 152.

The deceleration reference signal generator circuit 152 generates deceleration reference signal according to an input from a modified gradient generator circuit 151. The deceleration reference signal generator circuit 152 limits the value of the deceleration reference signal within a predetermined range defined by an upper limit value e.g. $-0.1$ G and a lower limit value, e.g. $-1.2$ G.

The integrator circuit 73 comprises a capacitor 75 and an analog switch 76 in addition to the operational amplifier 74. The circuit construction and operation of the integrator per se are well known to those skilled in the art and is adapted to integrate the input voltage input through the analog switches 67, 71 and 72. The integrator circuit 73 outputs an integrator signal having a value indicative of the integrated value Ve $$\left( = \int_0^t (-E) \times dt \right).$$

The analog switch 76 comprises MOS transistor having a gate electrode connected to a one-shot pulse generator circuit 66. The one-shot pulse generator circuit 66 is connected to an ignition switch (not shown) and to the inverting output terminal of the NOR gate 63. Therefore, the one-shot pulse generator circuit 66 is triggered by the leading edge of the HIGH level ignition signal which is maintained HIGH level while the ignition switch is held ON and by the leading edge of the HIGH level output of the NOR gate 63. The one-shot pulse $S_1$ of the one-shot pulse generator circuit 66 serves as reset signal for the integrator circuit 73 to clear the integrated value.

The one-shot pulse generator circuit 66 is further connected to an analog switch 81 in a sample/hold circuit 77. The sample/hold circuit 77 comprises buffer amplifier 78 and 79, a capacitor 80 and the analog switch 81. As will be seen from FIG. 2, the sample/hold circuit 77 samples and holds the common wheel speed representative signal of the select-HIGH switch 45. The one-shot pulse $S_1$ of the one-shot pulse generator circuit 66 serves as reset signal for the sample/hold circuit 77 to clear the held value therein and updated by the instantaneous common wheel speed representative value.

The integrated value Ve of the integrator circuit 73 and the sampled value Vs of the sample/hold circuit 77 are input to an adder circuit 82. The adder circuit 82 adds the integrated value Ve to the sampled value Vs to derive the projected vehicular speed representative data Vi to be fed to the target wheel speed derivation circuits 28a, 28b and 28c.

The re-application detecting stage 300 comprises application counters 90a, 90b and 90c. Each application counter 90a, 90b and 90c is of identical construction to the others. Therefore, only the application counter 90a is illustrated in detail and will be given detailed discussion about circuit components and operations thereof.

The application counter 90a has a one-shot pulse generator circuit 91 and a level converter circuit 92. The one-shot pulse generator circuit 91 is connected to the output terminal of the comparator 34a and responsive to the trailing edge of the HIGH level comparator signal of the comparator 34a to generate a one-shot pulse. On the other hand, the level converter circuit 92 is connected to an OR gate 40a to receive therefrom the inlet control signal $EV_1$. The level converter 92 adjusts the level of the inlet control signal $EV_1$ and feeds to an integrator circuit 93 which includes an operational amplifier, a capacitor and an analog switch. The integrator circuit 93 integrates the adjusted level of the inlet control signal EV to output the integrated value indicative signal to the adder circuit 151 and to a comparator 94 in the basic gradient correcting stage 400. As will be appreciated, the integrated value of the integrator circuit 93 represents the magnitude of increasing of the braking pressure in the right-front wheel cylinder 1a in APPLICATION mode. The analog switch of the integrator circuit 93 is reset by the one-shot pulse of the one-shot pulse generator circuit 91.

Figure 3:
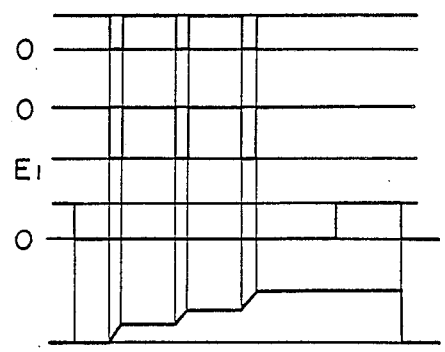
FIG. 3 is a timing chart showing operation of a counter which counts up occurrences of APPLICATION mode operation of the anti-skid brake control system of FIGS. 1(A) and 1(B)

Though the application counter 90a which monitors re-application (re-entry into APPLICATION mode) in the right-front wheel 1, is connected to the comparator 94, it is possible to select one of the application counters 90a, 90b and 90c to the comparator. Therefore, the specific circuit construction shown in FIG. 2 is to be regarded as merely an example of implementation of the present invention. The application counter 90a detects the trailing edge of the inlet control signal $EV_1$ to count up the occurrence, as shown in FIG. 3. This count value of the application counter 90a serves as a value representative of magnitude of increase of the braking fluid pressure in the right-front wheel cylinder 1a. Similarly, respective application counters 90b and 90c count up occurrences of termination of APPLICATION mode and thereby monitors increasing magnitude of the braking fluid pressure.

The comparator 94 of the basic gradient correcting stage 400 has non-interting input terminal connected to the output of the integrator circuit 93 of the re-application detecting stage 300. The comparator 94 also has an inverting input terminal connected to a threshold generator (not shown) to receive therefrom a predetermined HIGH/LOW friction road criterion. Therefore, when the integrated value indicative signal of the integrator circuit 93 is greater than or equal to the HIGH/LOW friction road criterion, which represents a higher friction than a criterion friction represented by the HIGH/LOW friction road criterion, the comparator 94 produces a HIGH level comparator signal. The output terminal of the comparator 94 is connected to an one-shot pulse generator circuit 95 which is responsive to trailing edge of the HIGH level comparator signal of the comparator 94 to generate the one-shot pulse. The one-shot pulse thus produced by the one-shot pulse generator circuit 95 is fed to one of the input terminals of an AND gate 96. The AND gate 96 has three input terminals. Another input terminal of the AND gate 96 is connected a comparator 97 which compares the output of the absolute value circuit 98 representative of the absolute value |m| of the basic gradient indicative data m with a preset value, e.g. 0.4 g. The other input terminal of the AND gate 96 is connected to a NOT gate 104 of a lock period measuring circuit 99.

Figure 4:
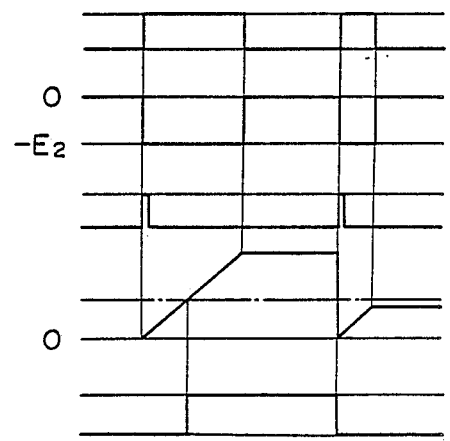
FIG. 4 is a timing chart showing operation of a timer which measures a period of time in which a vehicular wheel is held in locked condition.

The lock period measuring circuit 99 comprises a one-shot pulse generator circuit 105, an inverter 101 and an integrator circuit 102. The one-shot pulse generator 105 is connected to the comparator 35a. The comparator 35a is also connected to the integrator circuit 102 via a NOT gate 101. The NOT gate 101 inverts the output of the comparator 35a to input to the integrator circuit 102. The one-shot pulse generator circuit 105 is triggered by the leading edge of the HIGH level comparator signal of the comparator 35a to output the one-shot pulse to reset the integrator 102. The integrator circuit 102 is connected to non-inverting input terminal of a comparator 103. As shown in FIG. 4, the integrator circuit 102 is reset by the shot pulse of the one-shot pulse generator circuit 105 and integrates the inverted input from the comparator 35a which is inputted via the inverter 101. The comparator 103 has an inverting input terminal to receive the HIGH/LOW friction road criterion to output the HIGH level comparator signal as long as the integrated value from the integrator circuit 102 is greater than or equal to the HIGH/LOW friction road criterion. The output of the comparator 103 is fed via the NOT gate 104 at inverted form.

The AND gate 96 is responsive to satisfying the AND condition of the three inputs set forth above to output HIGH level gate signal. The gate signal of the AND gate 96 is connected to the switches 50 and 51 and also to the OR gate G4. By the input to the sample/hold circuits 141a and 141c via the OR gate G4 from the AND gate 96, the sampled values $V_0$, $T_0$ to $V_b$ and $T_b$ which are sampled by the sample/hold circuits 141b and 141d. By this basic gradient to be derived by the basic gradient derivation stage 100 can be corrected.

FIG. 3 shows a detailed construction of the variable timer 42a. The variable timer 42a generally comprises a first timer 51 and a second timer 52. The first timer 50 has an input port B connected to the output terminal of the comparator 34a through an inverter 52 to receive therefrom the inverted comparator signal. The first timer 50 is designed to be triggered in response to the trailing edge of the HIGH level input at the input port B to output timer signal $Q_A$ for a given period of time $T_1$. The period $T_1$ to maintain the timer signal $Q_A$ is determined by a time constant derived from a capacity of a capacitor 54 and a resistance of a variable resistor 55 connected to the terminals $T_1$ and $T_2$ of the first timer 50. The variable resistor 55 is connected to the aforementioned peak detector circuit 44a to receive therefrom the amplifier output as a wheel acceleration peak indicative input. The resistance of the variable resistor 55 is adjusted depending upon the peak value $\alpha w_{max}$ as indicated in the wheel acceleration peak indicative signal. Therefore, the timer period of the first timer 50 is variable in proportion to the magnitude of the peak value $\alpha w_{max}$.

Figure 5:
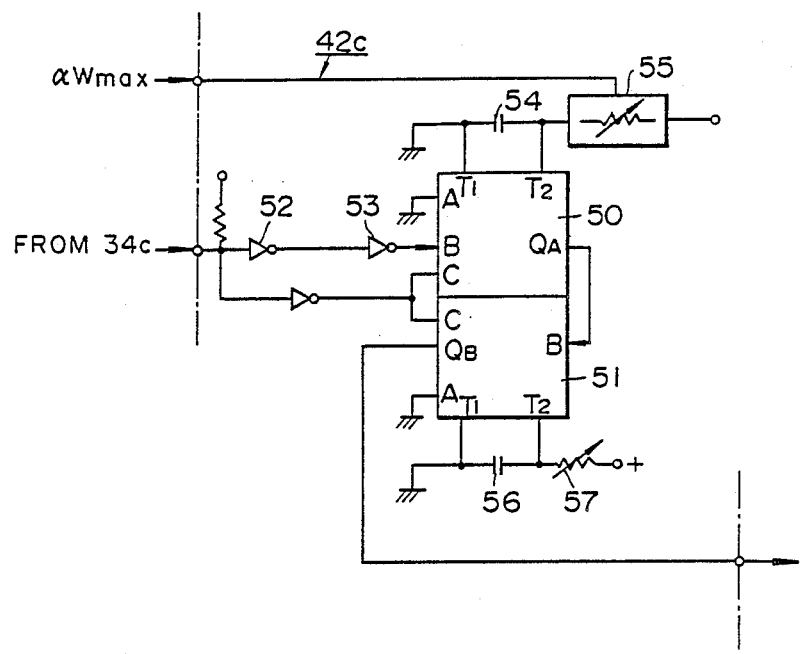
FIG. 5 is a block diagram of the preferred construction of a variable timer to be employed in the preferred embodiment of the anti-skid brake control system of FIGS. 1(A) and 1(B)
Figure 6:
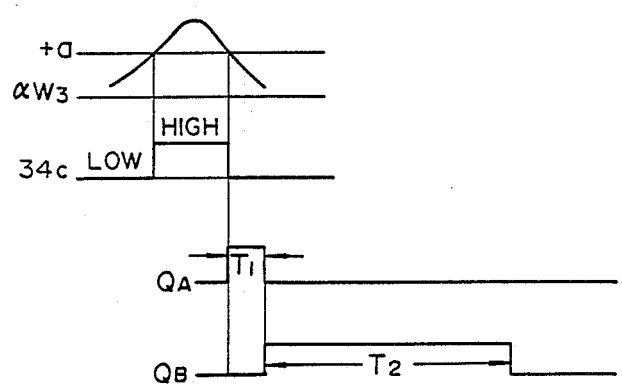
FIG. 6 is a timing chart showing operation of the variable timer of FIG. 5.

The timer signal $Q_A$ of the first timer 50 is fed to a B input port of the second timer 51. The second timer 51 has a time constant circuit consisting of a capacitor 56 and a variable resistor 57 for providing a timer period $T_2$. The time constant of the time constant circuit of the capacitor 56 and the variable resistor 57 is set constant in order to set the timer period $T_2$ constant. Therefore, the second timer 51 is triggered by the trailing edge of the HIGH level input at the B input terminal. The second timer 51, when triggered, outputs HIGH level timer signal for the timer period determined by the time constant of the time constant circuit of the capacitor 56 and the variable resistor 57, through $Q_B$ output terminal for the given period of time $T_2$, as shown in FIG. 5.

FIG. 4 shows a detailed construction of the variable timer 42a. The variable timer 42a generally comprises a first timer 51 and a second timer 52. The first timer 50 has an input port B connected to the output terminal of the comparator 34a through an inverter 52 to receive therefrom the inverted comparator signal. The first timer 50 is designed to be triggered in response to the trailing edge of the HIGH level input at the input port B to output timer signal $Q_A$ for a given period of time $T_1$. The period $T_1$ to maintain the timer signal $Q_A$ is determined by a time constant derived from a capacity of a capacitor 54 and a resistance of a variable resistor 55 connected to the terminals $T_1$ and $T_2$ of the first timer 50. The variable resistor 55 is connected to the aforementioned peak detector circuit 44a to receive therefrom the amplifier output as a wheel acceleration peak indicative input. The resistance of the variable resistor 55 is adjusted depending upon the peak value $\alpha w_{max}$ as indicated in the wheel acceleration peak indicative signal. Therefore, the timer period of the first timer 50 is variable in proportion to the magnitude of the peak value $\alpha w_{max}$.

The timer signal $Q_A$ of the first timer 50 is fed to a B input port of the second timer 51. The second timer 51 has a time constant circuit consisting of a capacitor 56 and a variable resistor 57 for providing a timer period $T_2$. The time constant of the time constant circuit of the capacitor 56 and the variable resistor 57 is set constant in order to set the timer period $T_2$ constant. Therefore, the second timer 51 is triggered by the trailing edge of the HIGH level input at the B input terminal. The second timer 51, when triggered, outputs HIGH level timer signal for the timer period determined by the time constant of the time constant circuit of the capacitor 56 and the variable resistor 57, through $Q_B$ output terminal for the given period of time $T_2$, as shown in FIG. 5.

Figure 7:
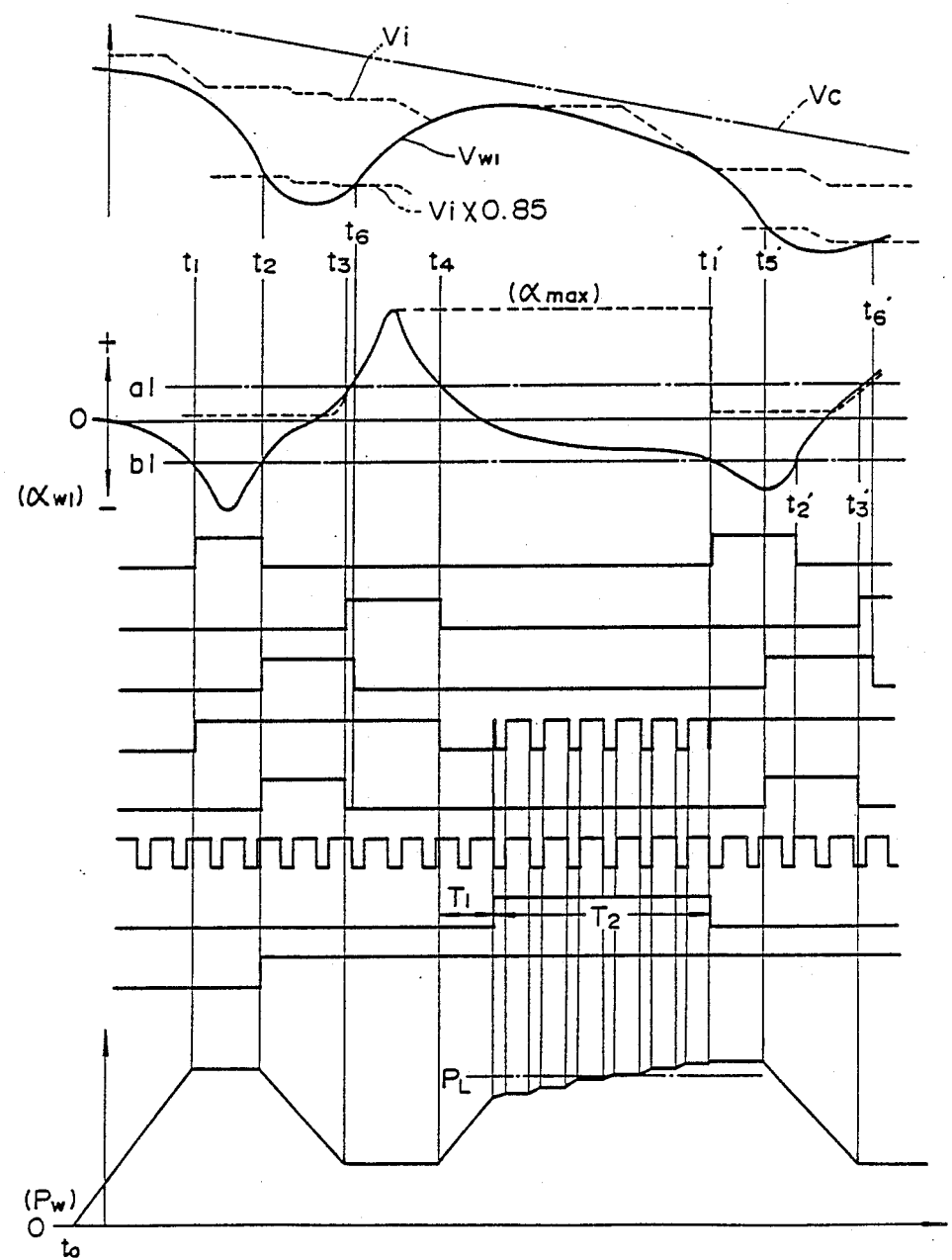
FIG. 7 is a timing chart showing anti-skid brake control operation to be performed by the preferred embodiment of the anti-skid brake control system of FIGS. 1(A) and 1(B)

FIG. 7 shows a timing chart of the operation of the controller circuit section 18a in anti-skid brake control for the right-front wheel. In the practical control, the anti-skid brake control is performed to maintain the wheel slippage $\lambda$ at an optimal value at which maximum braking performance can be obtained. As set forth, maximum tire/road friction $\mu$ can be obtained near 15% of wheel slippage $\lambda$. Therefore, the shown embodiment of the anti-skid brake control system performs control for the braking pressure to maintain the wheel speed of 85% of the projected vehicular speed representative data Vi.

In FIG. 7, the line Vc represents actual vehicular speed experimentarily monitored.

It is assumed that vehicular brake is applied for deceleration of the vehicle by depressing the brake pedal 16 at a time $t_0$, hydraulic braking pressure is built up and distributed to all of the wheel cylinders 1a, 2a, 3a and 4a in common. According to an increase of the braking pressure in the wheel cylinder 1a, the right-front wheel 1 is decelerated. At the initial stage of braking operation, the deceleration magnitude which is negative value of acceleration data $(-\alpha w_1)$ of the right-front wheel, is maintained greater than the preset deceleration threshold $b_1$ which, is a negative value representing a predetermined deceleration magnitude. As long as the deceleration magnitude representative data $-\alpha w_1$ is maintained greater than the deceleration threshold value $b_1$, the operation mode of the anti-skid brake control system is maintained in the APPLICATION mode for increasing braking pressure in the right-front wheel cylinder 1a according to an increase of hydraulic pressure in the master cylinder 11.

At this position, since the deceleration magnitude representative data $-\alpha w_1$ is greater than the deceleration threshold value $b_1$, the output of the comparator 33a is maintained at a LOW level. At this time, since the wheel is decelerating, the wheel acceleration magnitude data $\alpha w_1$ is held negative as set forth above and therefore smaller than the acceleration threshold value $a_1$. Therefore, the output of the comparator 34a is also maintained at the LOW level. Furthermore, at this time, the magnitude of the wheel slippage data $\lambda$ is maintained smaller than the wheel slippage threshold which is represented by a target wheel speed $V\lambda_1$. Therefore, the output level of the comparator 35a is also maintained at the LOW level. At this condition, the gate output of the OR gate 36 and output of the AND gate 38a are maintained at LOW levels.

Since all of the input levels of the three inputs from the AND gates 38a, 38b and 38c are maintained at the LOW level, the output level of the OR gate 29 is further hold at the LOW level. By maintaining the output of the OR gate 29 the LOW level, the retriggerable timer 30 is maintained inactive to maintain the MR signal LOW level.

At this position, since the output level of the amplifier 37a, as the inlet control signal $EV_1$ is maintained at the LOW level to maintain the EV valve 19a open. At the same time, since the output level of the amplifier 39 is also maintained at the LOW level, as the outlet control signal $AV_1$ is maintained at the LOW level to maintain the AV valve 20a closed. Therefore, operational mode of the anti-skid brake control system is maintained at the APPLICATION mode.

At a time $t_1$, the deceleration magnitude data $-\alpha w_1$ of the right-front wheel 1 decreases across the wheel deceleration threshold b. This results in initiation of anti-skid brake control. Namely, since the deceleration magnitude data $-\alpha w_1$ becomes smaller than the wheel deceleration threshold b, the comparator signal of the comparator 33a goes into the HIGH level. This changes the gate signals of the OR gates 36a and 40a into HIGH level. Therefore, the inlet control signal $EV_1$ output through the amplifier 37a goes to the HIGH level. Therefore, both of the EV valves 19a are shut at the time $t_1$. At this time, since the output of the AND gate 38a is held at LOW the level, the outlet control signal $AV_1$ is held LOW. Therefore, the AV valve 20a is also maintained at closed position. Therefore, the anti-skid brake control valve assembly 17a is placed in the HOLD mode position. The braking pressure in the wheel cylinder 1a is thus held constant at the pressure level at the time $t_1$.

For the initial cycle of the anti-skid brake control, the projected vehicular speed representing data Vi is derived by the vehicle speed representing value derivation system 27. Based on the projected vehicular speed representing data Vi, the target wheel speed $V\lambda_1$ is derived at a value 85% of Vi. As described above, since the projected vehicular speed representing data Vi decreases according to the integrated value of the integrator circuit 73, the target wheel speed $V\lambda_1$ decreases continuously. At a time $t_2$, the right-front wheel speed $Vw_1$ is decelerated across the target wheel speed $V\lambda_1$. Then, the comparator signal of the comparator 35a turns into HIGH level. At this time, since the comparator signal of the comparator 34a is held LOW to apply the HIGH level input to the AND gate 38a through the inverting input terminal, AND condition is established at the AND gate 38. Therefore, the gate signal of the AND gate 38a goes into the HIGH level to cause HIGH level outlet control signal $AV_1$. This operates the anti-skid brake control valve assembly 17a into the RELEASE mode position. Therefore, the braking pressure in the right-front wheel cylinder 1a is decreased by feeding back the pressurized braking fluid to the pressure accumulators 22a. At the same time, by the HIGH level outlet control signal $AV_1$, the retriggerable timer 30 is triggered to start outputting of the pump drive signal MR. Therefore, the pump motor 24 is start driving to drive the fluid pump 21a.

By decreasing the braking pressure in the right-front wheel cylinder 1a, the wheel speed $Vw_1$ is resumed and therefore wheel acceleration $\alpha w_1$ is increased. The wheel acceleration $\alpha w_1$ increases across the wheel deceleration threshold b. Therefore, the comparator signal of the comparator 33a goes into the LOW level. However, at this time, since the HIGH level comparator signal of the comparator 35a is input to the OR gate 36, the gate signal of the OR gate 36 is maintained at the HIGH level. Therefore, the gate signal of the OR gate 40a is held HIGH to maintain the inlet control signal $EV_1$ at HIGH level. Therefore, the anti-skid control valve assembly 17a is maintained at the RELEASE mode. Thus, the wheel speeds $Vw_1$ continue to increase. Accordingly, the wheel acceleration $\alpha w_1$ further increases. At a time $t_3$, the wheel acceleration $\alpha w_1$ increases across the wheel acceleration threshold a which is positive value and representative of a predetermined wheel acceleration criterion. This results in HIGH level comparator signal of the comparator 34a. This HIGH level comparator signal of the comparator 34a turns the input level at the inverting input terminal of the AND gate 38a into the LOW level. Therefore, the AND gate signal of the AND gate 38a goes into the LOW level. Therefore, the outlet control signal $AV_1$ turns into LOW level to close the AV valve 20a in the anti-skid brake control valve assembly 17a. As a result, the anti-skid brake control valve assembly 17a is again placed into the HOLD mode to maintain the braking pressure level constant at the pressure level at the time $t_3$. By holding the braking pressure at a decreased level, the wheel speed $Vw_1$ still increases. Also, according to an increase of the wheel speed, wheel acceleration $\alpha w_1$ increases toward the peak $\alpha w_{max}$. As seen from FIG. 7, the right-front wheel speed $Vw_1$ increases across the target wheel speed $V\lambda_1$ at a time $t_6$. This results in the LOW level comparator signal of the comparator 35a. At this time, since the wheel acceleration data $\alpha w_1$ is maintained greater than the acceleration threshold a, the comparator signal of the comparator 34a is maintained at the HIGH level. Therefore, even by turning the comparator signal of the comparator 35a into the LOW level from the HIGH level, the gate signal level of the OR gate 36a is maintained HIGH level to maintain the inlet control signal $EV_1$ HIGH level.

At a time $t_4$, the wheel acceleration $\alpha w_1$ drops across the wheel acceleration threshold a. In response to drop of the wheel acceleration $\alpha w_1$ across the wheel acceleration threshold a, the comparator signal of the comparator 34a turns into the LOW level. Therefore, the all of the inputs to the OR gate 36a become LOW level. Therefore, the OR gate signal of the OR gate 36a turns into LOW level to cause LOW level inlet control signal $EV_1$ at the time $t_4$. At the same time, the variable timer 42a is activated by the trailing edge of the HIGH level comparator signal of the comparator 34a to output HIGH level timer signal for a period $T_2$ after a delay time $T_1$ which is variable depending upon the wheel acceleration peak value as latched by the peak hold circuit 44a. During the period $T_2$, the oscillator 43a is triggered to output constant pulse signals. As will be appreciated, while the pulse signal is maintained ON (HIGH) level, AND conditions are established in the AND gate 41a to maintain the inlet control signal $EV_1$ at HIGH level. Therefore, during the delay time $T_1$, the anti-skid brake control valve assembly 17a is held in APPLICATION mode to increase the braking pressure. On the other hand, during the period $T_2$, the operation mode of the anti-skid brake control valve assembly 17a alternates between APPLICATION mode and HOLD mode repeatedly at a frequency corresponding to ON/OFF frequency of the pulse signal generated by the oscillator 43a.

As will be seen from FIG. 7, during the $T_2$ period, in which the operational mode of the pressure control assembly 17a alternatively and repeatedly switched between APPLICATION mode and HOLD mode, the braking pressure Pw in the right-front wheel cylinder 1a increases gradually in a stepwise fashion and can be maintained near an ideal pressure $P_L$ at which optimal braking efficiency can be obtained. The ideal pressure $P_L$ will be hereafter referred to as "lock pressure".

At a time $t_1'$, the wheel acceleration $\alpha w_1$ drops across the wheel deceleration threshold b. Therefore, another cycle of anti-skid brake control is initiated. At the same time, the peak hold circuit 44a is reset by the leading edge of the HIGH level comparator signal of the comparator 33a. Thereafter, one skid cycle of anti-skid brake control operation is performed starting at the time $t_1'$.

In the subsequent anti-skid brake control in the second skid cycle, the operational mode of the anti-skid control valve assembly 17a is switched into RELEASE mode at a time $t_5'$, at which the wheel speed $Vw_1$ decreasing across the target wheel speed $V\lambda_1$. At a time $t_2'$, the wheel acceleration $\alpha w_1$ is increased across the deceleration threshold b. As set forth above, at this time, the operational mode of the anti-skid control valve assembly 17a is maintained in RELEASE mode to further decrease the braking pressure Pw. At a time $t_3'$, the wheel acceleration $\alpha w_1$ increases across the acceleration threshold a to cause switching of operational mode of the anti-skid control valve assembly 17a from the RELEASE mode to HOLD mode. As will be appreciated herefrom, the subsequent skid control operation is performed, according to the schedule set forth above, over one or more cycles until the vehicle stops or the braking operation is terminated.

In case of the anti-skid brake control operation to be commonly taken place by the anti-skid control valve 17c, the technologies for preventing the pair of rear wheels from causing synchroneous locking, disclosed in the German Patent First Publication No. 36 44 325, which corresponds to the co-pending U.S. patent application Ser. No. 945,562, filed on Dec. 23, 1986, and assigned to the common assignee to the present invention. The disclosures of the aforementioned German First Publication and the co-pending U.S. Patent Application are herein incorporated by reference for the sake of disclosure.

The operation of the projected vehicular speed derivation circuit 46 will be discussed herebelow with reference to FIGS. 8 and 9.

Figure 8:
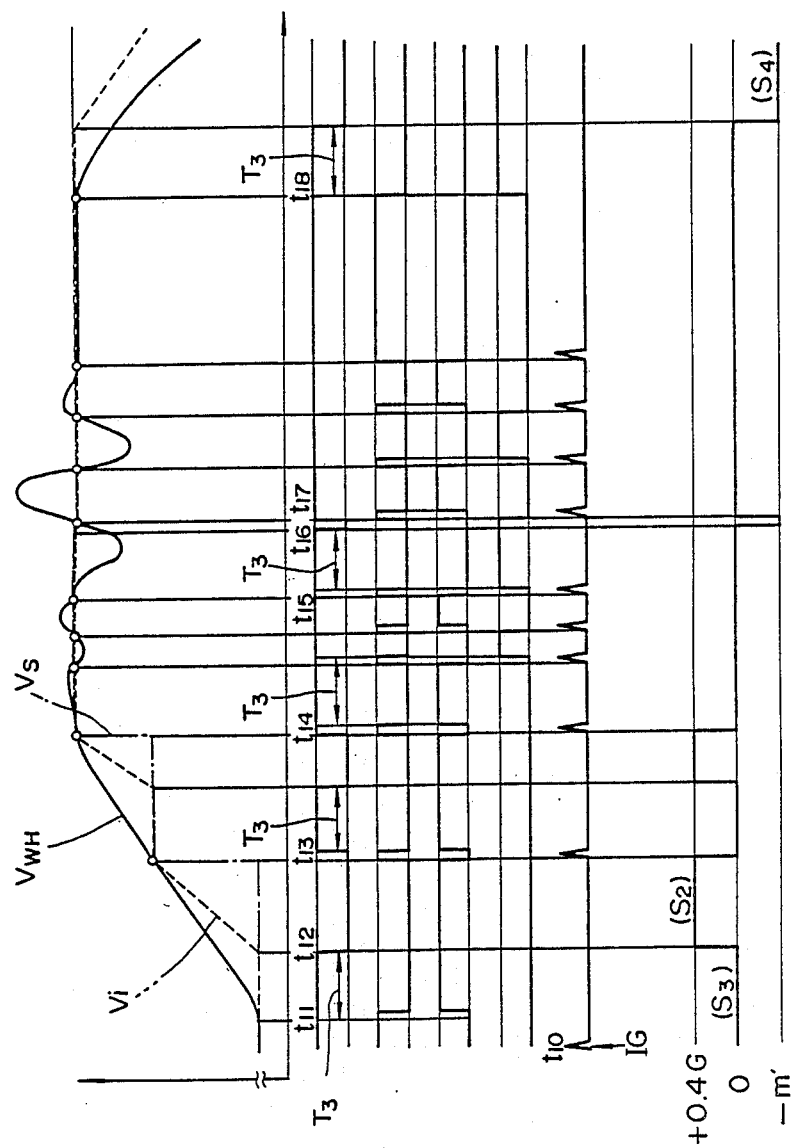
FIGS. 8 and 9 are timing charts respectively showing operation of the projected vehicular speed representative datum derivation circuit of FIGS. 2(A) and 2(B).
Figure 9:
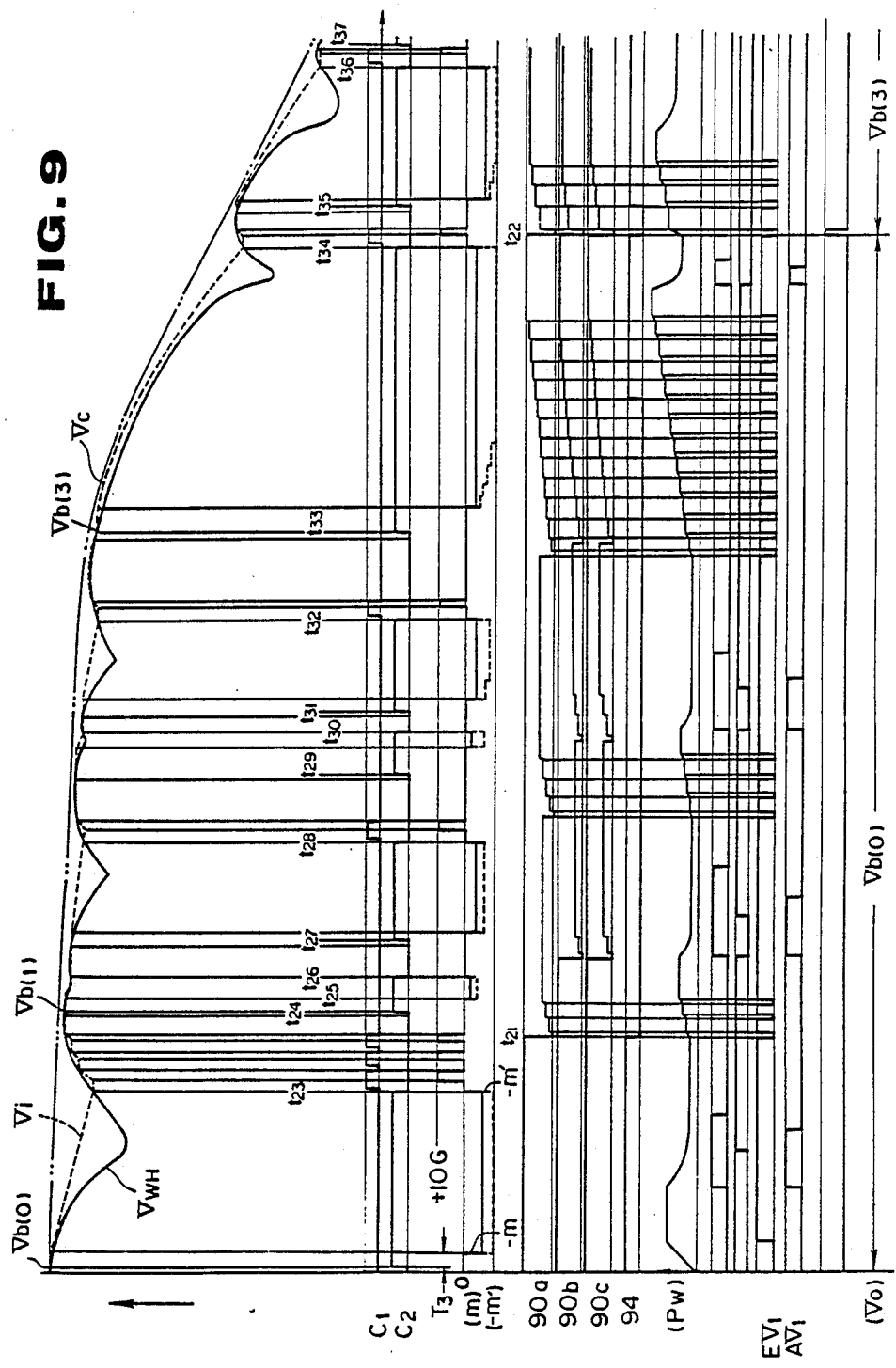

At first the operation of the projected vehicular speed derivation stage 200 in the projected vehicular speed derivation circuit 46 will be discussed assuming that the common wheel speed representative data Vw varies as shown in FIG. 8. It is further assumed that the gradient (−m) is maintained constant.

At a time $t_{10}$, the ignition switch is turned into ON from OFF position. Therefore, the one-shot pulse generator circuit 66 is responsive to the leading edge of the HIGH level ignition signal IG to generate the shot pulse $S_1$ which serves as the reset pulse for the integrator circuit 73 and the sample/hold circuit 77. By this, the integrator circuit 73 is cleared the integrated value Ve to zero to restart integration of the voltage signals E input through the analog switches 71, 67 and 72. At the same time, the sample/hold circuit 77 is reset the sampled value and update the sampled value Vs with the instantaneous common wheel speed representative data Vw at the time $t_{10}$. The sampled value Vs is illustrated by one-dotted line in FIG. 8. At the time $t_{10}$, since the integrated value Ve is reset and thus is zero (0), the output value as the projected vehicular speed representative data Vi becomes equal to the sampled value Vs of the sample/hold circuit 77.

At this time $t_{10}$, since the sampled value Vs is equal to the common wheel speed representative data Vw, it becomes smaller than the upper deadband reference signal value Vi+ and greater than the lower deadband reference signal value Vi−. Therefore, both outputs C1 and C2 of the comparators 59 and 60 become LOW level. Therefore, the output of the NOR gate 63 becomes HIGH level. By the HIGH level gate signal of the NOR gate 63, the outlet level of the OR gate 65 is maintained HIGH. By this HIGH level gate signal $S_3$ of the OR gate 65, the analog switch 67 is turned ON to connect the inverting input terminal of the operational amplifier 74 of the integrator circuit 73 to the ground. At this time, because of the LOW level comparator signals of the comparators 59 and 60, the AND gates 69 and 70 are held non-conductive to maintain respectively associated analog switches 71 and 72 at non-conductive state. Because that the input voltage E is maintained at zero, the integrated value of the integrator circuit 73 is maintained at zero. Therefore, the projected vehicular speed representative data Vi is maintained at the sampled value Vs.

Assuming the common wheel speed representative data Vw becomes greater than or equal to the upper deadband reference signal value Vi+ at a time $t_{11}$, the output level of the comparator 59 turns into HIGH. By turning the comparator signal C1 into HIGH level, the output level of the NOR gate 63 becomes LOW. However, at this time, the timer 64 is set by the trailing edge of the HIGH level gate signal of the NOR gate 63 to input HIGH level signal to the OR gate 65 for the given period of time $T_3$. Therefore, during the period $T_3$, the output level of the OR gate 65 is maintained at HIGH level. By this HIGH level gate signal of the OR gate 65, the one input to the AND gate 69 is maintained at LOW level due to inversion of the OR gate signal performed by the inverter 68. Therefore, the AND gate 69 is maintained non-conductive despite the HIGH level comparator signal of the comparator 59.

Upon expiration of the $T_3$ period, the OR gate signal of the OR gate 65 turns into LOW level at a time $t_{12}$. Then, the both input to the AND gate 69 become HIGH to make the gate conductive to cause the gate signal $S_2$ therefore to go to the HIGH level. In response to the HIGH level gate signal $S_2$ of the AND gate 69, the analog switch 71 is turned ON to connect the acceleration reference signal generator 85 to the integrator circuit 73. As a result, the integrator circuit integrates the input voltage E therefrom. Assuming the retriggerable timer 30 is not activated to maintain the MR signal at the LOW level, the internal switch of the acceleration reference signal generator circuit 85 selects 0.4 G as the input signal voltage E. Therefore, the projected vehicular speed representative data Vi increases as increasing of the integrated value Ve in a rate corresponding to 0.4 G. Therefore, the gradient of increase of the projected vehicular speed representative data Vi becomes the value corresponding to 0.4 G.

On the other hand, while the anti-skid brake control is performed and thus the MR signal is maintained at HIGH level, the acceleration reference signal generator circuit 85 selects the greater acceleration reference signal value, i.e. 10 G, so that the projected vehicular speed representative data Vi can be increased at a greater rate than that in the condition where anti-skid control is not performed, for a quicker approach to the common wheel speed representative data Vw.

As will be appreciated, by inputting the input voltage E having value 0.4 G or 10 G from the acceleration reference signal generator circuit 85, the integrated value Ve of the integrator circuit 73 increases. According to increasing of the integrated value Ve, the projected vehicular speed representative value Vi increases. Accordingly, the upper deadband reference signal value Vi+ (Vi+1.0 (km/h)) increases across the common wheel speed representative data Vw, at a time $t_{13}$. As a result, the comparator signal $C_1$ of the comparator 59 turns into LOW level to turn the gate signal of the NOR gate 63 into HIGH level. In response to the HIGH level gate signal of the NOR gate 63, the one-shot pulse generator circuit 66 produces the shot pulse to reset the sample/hold circuit 77 to hold the instantaneous common wheel speed representative data Vw as the sampled value Vs. At the same time, the integrated value Ve of the integrator circuit 73 is cleared. Similar to the process set forth with respect to the period $t_{11}$ to $t_{13}$, the projected vehicular speed representative data Vi is maintained at a value corresponding to the sampled value Vs until the given period $T_3$ of the timer 64 expires. Therefore, the integrated value Ve starts to increase the projected vehicular speed representative data Vi toward the common wheel speed representative data Vw after expiration of the aforementioned $T_3$ period. By this, the upper deadband reference signal Vi+ reaches the common wheel speed representative data Vw at a time $t_{14}$.

During the period between the time $t_{14}$ to a time $t_{15}$, the common wheel speed representative data Vw fluctuates across the upper and lower deadband reference signal values Vi+ and Vi− at a frequency to have an interval shorter than the $T_3$ period as seen from FIG. 8. According to variation of the common wheel speed representative data Vw across the upper deadband reference signal value Vi+, the comparator signal of the comparator 59 turns between HIGH and LOW levels. However, even when the comparator signal of the comparator 59 drops to LOW level, the HIGH level signal is into to the NOR gate 63 from the timer 64. Therefore, the gate signal of the OR gate 65 is maintained at HIGH level throughout the period between the time $t_{14}$ to $t_{15}$. As a result, the analog switch 67 is maintained at ON position to maintain the integrated value Ve of the integrator circuit 73 zero.

At a time $t_{15}$, the common wheel speed representative data from the select-HIGH switch 45 decreases across the lower deadband reference signal value Vi−. In response to this, the comparator signal $C_2$ of the comparator 60 goes into the HIGH level. By the HIGH level comparator signal $C_2$ of the comparator 60, the gate signal level of the NOR gate 63 goes LOW. Similar to above, the timer 64 is triggered by the trailing edge of the HIGH level gate signal of the NOR gate 63 to output HIGH level signal for the period $T_3$. Therefore, the gate signal of the OR gate 65 is maintained for the $T_3$ period in spite of the presence of HIGH level comparator signal of the comparator 60. At a time $t_{16}$, the $T_3$ period expires and the common wheel speed representative data Vw is held smaller than the lower deadband reference signal value Vi—, the gate signal of the OR gate 65 turns into LOW level to cause switching of the analog switch 67 from conductive state to non-conductive state. Simultaneously, the AND gate 70 becomes conductive to turn the analog switch 72 ON. As a result, the deceleration reference signal generator circuit 152 is connected to the integrator circuit 73 to input the deceleration reference signal —m' which represents the deceleration gradient modified to maintain the value within the upper and lower limit values, to the latter as the input voltage E. Therefore, the integrated value Ve decreases at a rate corresponding to the gradient defined by the deceleration reference signal value —m'. Accordingly, the projected vehicular speed representative value Vi decreases at the corresponding rate.

At a time $t_{17}$, the common wheel speed representative data Vw increases across the lower deadband reference signal value Vi—. Therefore, the comparator signal $C_2$ of the comparator 60 turns into LOW level. By this the NOR condition of the NOR gate 63 is established to cause the HIGH level gate signal of the latter. The one-shot pulse generator circuit 66 is responsive to the leading edge of the HIGH level gate signal of the NOR gate 63 to generate the shot pulse. By this shot pulse, the integrator circuit 73 is reset to clear the integrated value Ve. At the same time, the sample/hold circuit 77 is reset to update the sampled value Vs with the instantaneous common wheel speed representative data Vw.

In the period between the time $t_{17}$ and $t_{18}$, the common wheel speed representative data Vw fluctuates across the upper and lower deadband reference signal values Vi+ and Vi—. However, similar to that in the period $t_{14}$ to $t_{15}$ set forth above, because of higher frequency than that defined by the $T_3$ period of the timer 64, the integrated value Ve is maintained zero. After the time $t_{18}$, the common wheel speed representative data Vw decreases across the lower deadband reference signal value Vi—. Therefore, an operation similar to that discussed with respect to the period $t_{15}$ to $t_{17}$ is performed.

The operation of the overall circuit of the projected vehicular speed derivation circuit 46 during vehicular braking operation in which the anti-skid brake control is active, will be discussed herebelow with reference to FIG. 9. In the example of FIG. 9, it is assumed that the common wheel speed representative data Vw varies as shown.

As set forth, the application counter 90a counts up the occurrence of termination of the APPLICATION mode to monitor the increasing magnitude of the braking pressure Pw and is reset in response to trailing edge of the HIGH level comparator signal of the comparator 34a which represents the timing of re-application at times $t_{21}$ and $t_{22}$. This application counter 90a is not active at the initial skid cycle and is active in the second and subsequent skid cycles for counting up the occurrence of termination of the APPLICATION mode in increasing of the fluid pressure in stepwise fashion.

When the counter value of the acceleration counter 90a is greater than the HIGH/LOW friction road criterion, the comparator signal of the comparator 94 becomes HIGH level. As set forth, the counter value of the application counter 90a is reset in response to the trailing edge of the HIGH level comparator signal of the comparator 34a, which goes from the HIGH level to the LOW level when the wheel acceleration $\alpha w_1$ decreases across the acceleration threshold a. The one-shot pulse generator circuit 95 produces the shot pulse in response to the trailing edge of the HIGH level comparator signal of the comparator 34a which is input to the AND gate 95. On the other hand, the comparator 97 detects the output $|m|$ of the absolute value circuit 98 smaller than the HIGH/LOW friction road criterion to output HIGH level signal.

The lock period measuring circuit 99 is reset in response to the leading edge of the HIGH level comparator signal of the comparator 35a. The integrator circuit 102 in the lock period measuring circuit 99 is thus reset by the leading edge of the HIGH level comparator signal of the comparator 35a and integrates the elapsed time indicative value during the reset intervals. When the integrated value of the integrator circuit 102 is smaller than the HIGH/LOW friction road criterion, which represents that the road surface is in high-friction condition, the comparator signal of the comparator 103 becomes HIGH level and the gate signal of the NOT gate 104 becomes HIGH.

When the comparator signal level of the comparator 97 is HIGH and the gate signal of the NOT gate 104 is also HIGH, the AND gate 96 becomes conductive in response to the shot pulse of the one-shot pulse generator circuit 95 to output HIGH level gate signal in a form of a shot pulse corresponding to the shot pulse of the one-shot pulse generator circuit 95. Namely, the AND gate 96 outputs shot-pulse from the HIGH level gate signal in synchronism with transition of the road surface condition from LOW friction road to HIGH friction road as illustrated as the operation of the AND gate 96 at the time $t_{22}$. In response to the shot-pulse form gate signal of the AND gate 96, the switches 50 and 51 are maintained at the switch positions illustrated by the solid lines in FIG. 2. Therefore, as long as the AND gate 96 is maintained in a non-conductive state due to low friction of the road, the sample/hold circuits 141a and 141c are connected to the select-HIGH switch 45 and the timer counter 142. On the other hand, the switches 50 and 51 are switched into the switch positions as shown by the broken lines in FIG. 2 to connect the respective sample/hold circuits 141a and 141c to the sample/hold circuits 141b and 141d in order to update the sampled values $V_O$ and $T_O$ of the former with the sampled values $V_b$ and $T_b$ of the latter.

In the practical operation, assuming that the wheel acceleration $\alpha w_1$ does not become smaller than the deceleration threshold so as not to initiate anti-skid brake control operation and thus the MR signal of the retriggerable timer 30 is maintained at the LOW level, the common wheel speed representative data Vw decreases across the lower deadband reference signal value Vi— by braking operation. When the comparator signal $C_2$ of the comparator 60 goes into the HIGH level, the common wheel speed representative data Vw is sampled by the sample/hold circuits 141a and 141b as the sampled values $V_O$ and $V_b$ (0) in response to the leading edge of the comparator signal $C_2$ of the comparator 60. At the same time, the sample/hold circuits 141c and 141d samples the timer counter value as $T_O$ and $T_b$ (0).

At this time, because of the LOW level MR signal of the retriggerable timer 30, the flip-flop 153 is maintained at the reset position. Therefore, the output Q of the flip-flop 153 is maintained at LOW level. Therefore, the switching circuit 149 is maintained at the position illustrated by the solid line in FIG. 2 in order to connect the gradient signal generator circuit 148 to the absolute value circuit 98 and to the inverting circuit 150. Therefore, the preset initial gradient indicative signal representative of a preset gradient, e.g. 0.4 G, is fed to the absolute value circuit 98 and to the inverting circuit 150, as the basic gradient data m.

At this condition, since the counter values of the application counters 90a, 90b and 90c are maintained at saturated values. These counter values are added to the basic gradient data m which corresponds to the initial gradient indicative signal value. As a result, the gradient indicative data $-m$ as represented by the modified gradient generator circuit 151 becomes out of the predetermined range as defined by the upper and lower limit values in the deceleration reference signal generator circuit 152. The output of the deceleration reference signal generator circuit 152 becomes a value corresponding to the lower limit value, e.g. $-1.2$ G. Therefore, the projected vehicular speed representative data Vi is derived utilizing the derived deceleration reference signal value corresponding to the lower limit value.

It is further assumed that the anti-skid brake control is performed before the time $t_{23}$. At the time $t_{23}$, the common wheel speed representative data Vw increases across the lower deadband reference signal value $Vi-$. This causes the comparator signal $C_1$ of the comparator 59 to go into the HIGH level. The comparator 60 is responsive to this and outputs the HIGH level comparator signal $C_2$ at a time $t_{24}$. The sample/hold circuit 141b is responsive to the leading edge of the HIGH level sample and updates the sampled value with the instantaneous common wheel speed representative data Vw as the sampled value $V_b$. At the same time, the sample/hold circuit 141d samples the instantaneous timer value as the sampled value $T_b$ (1). These sampled values $V_b$ and $T_b$ of the sample/hold circuits 141b and 141d are subtracted from the samples values $V_O$ and $T_O$ of the sample/hold circuits 141a and 141c by the subtractor circuits 145 and 146. The subtracted wheel speed difference data $\Delta V_b$ ($=V_b-V_O$) derived by the subtractor 145 and the subtracted timer difference data $\Delta T_b$ ($=T_b-T_O$) derived by the subtractor circuit 146 fed to the divider circuit 147. The divider 147 divides the wheel speed difference data $\Delta V_b$ by the timer difference data $\Delta T_O$ to derive the basic gradient data m.

At this time, since the anti-skid brake control is active and thus the retriggerable timer 30 is triggered to output the HIGH level MR signal, the flip-flop 153 is set to output the HIGH level signal Q to the switching circuit 149. Therefore, the divider circuit 147 is connected to the absolute value circuit 98 and the inverter circuit 150. By this, the resultant basic gradient data m derived by the divider circuit 147 is fed to the the absolute value circuit 98 and the inverter circuit 150. By the process set forth above, the gradient for deriving the projected vehicular speed representative data Vi for the period between a time $t_{25}$ and a time $t_{26}$. Similarly, the gradient for deriving the projected vehicular speed representative data Vi for the subsequent skid cycles respectively between times $t_{27}$ to $t_{28}$, $t_{29}$ to $t_{30}$, $t_{31}$ to $t_{32}$, and $t_{33}$ to $t_{34}$ are performed in the same manner as set forth above.

According to the shown embodiment, since the sampled values $V_0$ and $T_0$ of the sample/hold circuits 141a and 141c are updated with the instantaneous sampled values $V_b$ and $T_b$ upon the transition between the LOW friction road to HIGH friction road, which is detected by the basic gradient correcting stage 400, the anti-skid control can be performed with minimized influence of variation of the road friction.

Furthermore, according to the invention, since the basic gradient can be modified with a correction factor variable depending upon the magnitude of braking force to be exerted to the wheel, the precision in projecting the vehicular speed representing data can be improved.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

For example, various circuit components can be modified or replaced with the equivalent components. For example, the technologies of derivation of the projected vehicular speed representative data may be applicable for the anti-skid brake control systems disclosed in the following co-pending U.S. applications, all of which are commonly assigned to the assignee of the present invention:

U.S. patent application Ser. No. 945,565, filed on Dec. 23, 1986

U.S. patent application Ser. No. 945,559, filed on Dec. 23, 1986, corresponding German Patent Application has been published under First Publication No. 36 44 324

U.S. patent application Ser. No. 945,562, filed on Dec. 23, 1986, corresponding German Patent Application has been published under First Publication No. 36 44 325 and U.S. patent application Ser. No. 945,715, filed on Dec. 23, 1986, corresponding German Patent Application has been published under First Publication No. 36 44 221.

The disclosures of the above-identified co-pending U.S. Patent Applications and the German counterparts are herein incorporated by reference.

Furthermore, though the shown embodiment concentrates on the anti-skid brake control system, the technologies of deriving the projected vehicular speed on the basis of the wheel speed may be applicable for other control systems, such as slip control, traction control, driving torque control and so forth. For example, the derivation of the projected vehicular speed representative value in the present invention may also be applicable for the following co-pending U.S. Patent Applications, all of which have been assigned to the common assignee to the present invention:

U.S. patent application Ser. No. 918,125, filed on Oct. 14, 1986, corresponding German Patent Application has been published under First Publication No. 36 34 627

U.S. patent application Ser. No. 918,137, filed on Oct. 14, 1986

U.S. patent application Ser. No. 918,080, filed on Oct. 14, 1986 and

U.S. patent application Ser. No. 918,081, filed on Oct. 14, 1986.

The disclosures of the above-identified co-pending U.S. Patent Applications and the German counterparts are herein incorporated by reference.

What is claimed is:

1. An anti-skid brake control system for an automotive brake system comprising:
    a hydraulic brake circuit comprising means for building up braking fluid pressure according to operational magnitude of a manually operable braking member, and means associated with a vehicular wheel for generating a braking force to decelerate said vehicular wheel;
    pressure adjusting means, disposed within said hydraulic circuit, for adjusting pressure of a working fluid to be delivered to said braking force generating means, said pressure adjusting means being operable at least in a first mode for increasing braking pressure in said braking force generating means and in a second mode for decreasing said braking pressure;
    sensor means for monitoring rotation speed of said vehicular wheel to produce a wheel speed indicative sensor signal value representative of said rotation speed of said vehicular wheel;
    first means for detecting a predetermined vehicular braking condition satisfying a predetermined anti-skid brake control condition for initiating anti-skid control operation;
    second means for latching a first wheel speed indicative value corresponding to said wheel speed indicative sensor signal value at a predetermined timing in each skid cycle and periodically latching a second wheel speed indicative value corresponding to said wheel speed indicative sensor signal value, for deriving a gradient of vehicular speed on the basis of said first and second wheel speed indicative values and an interval of occurrences of latching said first and second wheel speed indicative values;
    third means for monitoring a preselected gradient correction factor for deriving a correction value based thereon and for modifying said gradient of vehicular speed with said correction value resulting in a modified gradient;
    fourth means for deriving a projected vehicular speed representative datum in a second skid cycle immediately following a first skid cycle utilizing said modified gradient; and
    fifth means for controlling said pressure adjusting means between said first and second modes for maintaining said rotation speed of said vehicular wheel in a predetermined optimal relationship with said projected vehicular speed representative datum.

2. An anti-skid brake control system as set forth in claim 1, wherein said third means monitors braking pressure in said braking force generating means and derives said correction value based on said braking pressure.

3. An anti-skid brake control system as set forth in claim 2, wherein said pressure adjusting means is further operable in a third mode for holding said braking pressure in said braking force generating means constant, said fifth means performs anti-skid brake control in each skid cycle according to a predetermined schedule, in which said pressure adjusting means is operated alternatively and periodically in said first mode and said third mode for increasing braking pressure in said braking force generating means in a stepwise fashion, and said fourth means further counting occurrences of said first mode for detecting a magnitude of increasing of said braking pressure resulting in a counted value.

4. An anti-skid brake control system as set forth in claim 1, which further comprises sixth means for monitoring road friction varying across a predetermined road friction criterion to operate said second means for updating said first wheel speed indicative value with said second wheel speed indicative value.

5. An anti-skid brake control system as set forth in claim 3, which further comprises sixth means associated with said fourth means for receiving said counted value and comparing said counted value with a given criterion representative of a predetermined road friction criterion, said sixth means being responsive to an increase in said counted value above said given criterion for operating said second means for updating said first wheel speed indicative value with said second wheel speed indicative value.

6. An anti-skid brake control system as set forth in claim 5, wherein said sixth means is active when an absolute value of said gradient of vehicular speed is smaller than a preset value, to operate said second means for updating said first wheel speed indicative value with said second wheel speed indicative value in response to said counted value increasing above said predetermined road friction criterion.

7. An anti-skid brake control system as set forth in claim 5, wherein said fourth means is active when an absolute value of said gradient of vehicular speed is smaller than a preset value, to operate said second means for updating said first wheel speed indicative value with said second wheel speed indicative value in response to said counted value increasing above said predetermined road friction criterion.

8. An anti-skid brake control system as set forth in claim 1, which further comprises fifth means for monitoring road friction varying above a predetermined road friction criterion to operate said second means for updating said first wheel speed indicative value with said second wheel speed indicative value.

9. An anti-skid brake control system for an automotive brake system comprising:
    a hydraulic brake circuit comprising means for building up braking fluid pressure according to operational magnitude of a manually operable braking member, and means associated with a vehicular wheel for generating braking force to decelerate said vehicular wheel;
    pressure adjusting means, disposed within said hydraulic circuit, for adjusting pressure of a working fluid to be delivered to said braking force generating means, said pressure adjusting means being operable at least in a first mode for increasing braking pressure in said braking force generating means and in a second mode for decreasing said braking pressure;
    sensor means for monitoring rotation speed of said vehicular wheel to produce a wheel speed indicative sensor signal value representative of said rotation speed of said vehicular wheel;
    first means for detecting a predetermined vehicular braking condition satisfying a predetermined anti-skid brake control condition for initiating anti-skid control operation;
    second means for latching a first wheel speed indicative value corresponding to said wheel speed indicative sensor signal value at a predetermined timing in each skid cycle and periodically latching a second wheel speed indicative value corresponding to said wheel speed indicative sensor signal value, for deriving a gradient of vehicular speed on the basis of said first and second wheel speed indicative values and an interval of occurrences of latching of said first and second wheel speed indicative values;

third means for monitoring a preselected gradient correction factor for deriving a correction value based thereon and for modifying said gradient of vehicular speed with said correction value resulting in a modified gradient;

fourth means for monitoring road friction varying above a predetermined road friction criterion to operate said second means for updating said first wheel speed indicative sensor signal value with said second wheel speed indicative value;

fifth means for controlling said pressure adjusting means between said first and second modes for maintaining said rotation speed of said vehicular wheel in a predetermined optimal relationship with projected vehicular speed representative data.

10. An anti-skid brake control system as set forth in claim 9, which further comprises sixth means for monitoring braking pressure in said braking force generating means for deriving said correction value based on said braking pressure and for correcting said gradient of vehicular speed with said correction value.

11. An anti-skid brake control system as set forth in claim 10, wherein said pressure adjusting means is further operable in a third mode for holding said braking pressure in said braking force generating means constant, said fifth means performs anti-skid brake control in each skid cycle according to a predetermined schedule, in which said pressure adjusting means is operated alternatively and periodically in said first mode and said third mode in order to increase braking pressure in said braking force generating means in a stepwise fashion, said sixth means counting occurrences of said first mode for detecting a magnitude of increase in said braking pressure resulting in a counted value.

12. An anti-skid brake control system as set forth in claim 11, wherein said fourth means further receiving said counted value and comparing said counted value with a given criterion representative of said predetermined road friction criterion, said fourth means being responsive to an increase in said counted value above said predetermined road friction criterion for operating said second means for updating said first wheel speed indicative value with said second wheel speed indicative value.

13. An anti-skid brake control system for an automotive brake system comprising:

a hydraulic brake circuit comprising means for building up braking fluid pressure according to operational magnitude of a manually operable braking member, first braking force generating means, associated with a first vehicular wheel for generating braking force to decelerate said first vehicular wheel, and second braking force generating means, associated with a second vehicular wheel, for generating braking force to decelerate said second vehicular wheel;

first pressure adjusting means, disposed within said hydraulic circuit, for adjusting pressure of a working fluid to be delivered to said first braking force generating means, said first pressure adjusting means being operable at least in a first mode for increasing braking pressure in said first braking force generating means and in a second mode for decreasing braking pressure in said first braking force generating means;

second pressure adjusting means, disposed within said hydraulic circuit, for adjusting pressure of a working fluid to be delivered to said second braking force generating means, said second pressure adjusting means being operable at least in a first mode for increasing braking pressure in said second braking force generating means and in a second mode for decreasing braking pressure in said second braking force generating means;

first sensor means for monitoring rotation speed of said first vehicular wheel to produce a first wheel speed indicative sensor signal value representative of said rotation speed of said first vehicular wheel;

second sensor means for monitoring rotation speed of said second vehicular wheel to produce a second wheel speed indicative sensor signal value representative of said rotation speed of said second vehicular wheel;

means for comparing said first and second wheel speed indicative sensor signal values and for selecting one having greater value as a common wheel speed indicative sensor signal value;

first means for detecting a predetermined vehicular braking condition satisfying a predetermined anti-skid brake control condition for initiating anti-skid control operation;

second means for latching a first wheel speed indicative value corresponding to said common wheel speed indicative sensor signal value at a predetermined timing in each skid cycle and periodically latching a second wheel speed indicative value corresponding to said common wheel speed indicative sensor signal value, for deriving a gradient of vehicular speed on the basis of said first and second wheel speed indicative values and an interval of occurrences of latching of said first and second wheel speed indicative values;

third means for monitoring a preselected gradient correction factor for deriving a correction value based thereon and for modifying said gradient of vehicular speed with said correction value resulting in a modified gradient;

fourth means for deriving a projected vehicular speed representative datum in a second skid cycle immediately following a first skid cycle utilizing said modified gradient; and fifth means for controlling both of said first and second pressure adjusting means between said first and second modes for maintaining said rotation speed of said first and second vehicular wheels in a predetermined optimal relationship with said projected vehicular speed representative datum.

14. An anti-skid brake control system as set forth in claim 12, wherein said fourth means monitors braking pressure in said first and second braking force generating means and derives said correction value based on said braking pressure.

15. An anti-skid brake control system as set forth in claim 13, wherein said first and second pressure adjusting means are further operable in a third mode for holding said braking pressure in said first and second braking force generating means constant, said fifth means performs anti-skid brake control in each skid cycle according to a predetermined schedule, in which both of said first and second pressure adjusting means are operated alternatively and periodically in said first mode and said third mode in order to increase braking pressure in said first and second braking force generating means respectively in a stepwise fashion, and said fourth means further counting occurrences of said first mode for detecting a magnitude of increasing of said braking pressure resulting in a counted value.

16. An anti-skid brake control system as set forth in claim 13, which further comprises sixth means for monitoring road friction varying above a predetermined road friction criterion to operate said second means for updating said first wheel speed indicative value with said second wheel speed indicative value.

17. An anti-skid brake control system as set forth in claim 15, which further comprises sixth means associated with said fourth means for receiving said counted value and comparing said counted value with a given criterion representative of a predetermined road friction criterion, said sixth means being responsive to an increase is said counted value above said given criterion for operating said second means for updating said first wheel speed indicative value with said second wheel speed indicative value.

18. An anti-skid brake control system as set forth in claim 17, wherein said sixth means is active when an absolute value of said gradient of vehicular speed is smaller than a preset value, to operate said second means for updating said latched first wheel speed indicative value with said second wheel speed indicative value in response to said counted value increasing above said predetermined road friction criterion.

19. A system for deriving a projected vehicle speed representative datum on the basis of a rotation speed of a vehicular wheel, for use in a vehicular slip control, comprising:

sensor means for monitoring rotation speed of said vehicular wheel to produce a wheel speed indicative sensor signal value representative of said rotation speed of said vehicular wheel;

first means for detecting a predetermined vehicular braking condition satisfying a predetermined anti-skid brake control condition for initiating anti-skid control operation;

second means for latching a first wheel speed indicative value corresponding to said wheel speed indicative sensor signal value at a predetermined timing in each skid cycle and periodically latching a second wheel speed indicative value corresponding to said wheel speed indicative sensor signal value, for deriving a gradient of vehicular speed on the basis of said first and second wheel speed indicative values and an interval of occurrences of latching of said first and second wheel speed indicative values;

third means for monitoring a preselected gradient correction factor for deriving a correction value based thereon and for modifying said gradient of vehicular speed with said correction value resulting in a modified gradient; and fourth means for deriving said projected vehicular speed representative datum in a second skid cycle immediately following a first skid cycle utilizing said modified gradient.

20. An anti-skid brake control system as set forth in claim 18, wherein said fourth means monitors braking pressure in a braking force generating unit in order to derive said correction value based thereon.

* * * * *